(12) United States Patent
Viner et al.

(10) Patent No.: US 12,113,208 B2
(45) Date of Patent: Oct. 8, 2024

(54) PROTECTIVE MEMBRANE FOR ELECTROCHEMICAL CELLS

(71) Applicant: Sion Power Corporation, Tucson, AZ (US)

(72) Inventors: Veronika G. Viner, Tucson, AZ (US); David L. Coleman, Corona De Tucson, AZ (US); Michael G. Laramie, Tucson, AZ (US); Yuriy V. Mikhaylik, Tucson, AZ (US); Holger Schneider, Ludwigshafen (DE); Klaus Leitner, Ludwigshafen (DE); Joern Kulisch, Eppelheim (DE); Marina Safont-Sempere, Ludwigshafen (DE); Thomas Weiss, Ilvesheim (DE); Li Qun Ren, Pudong (CN)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 16/124,384

(22) Filed: Sep. 7, 2018

(65) Prior Publication Data
US 2019/0088958 A1  Mar. 21, 2019

Related U.S. Application Data

(60) Provisional application No. 62/559,015, filed on Sep. 15, 2017.

(51) Int. Cl.
*H01M 4/36* (2006.01)
*H01M 4/13* (2010.01)
(Continued)

(52) U.S. Cl.
CPC ............. *H01M 4/366* (2013.01); *H01M 4/13* (2013.01); *H01M 4/139* (2013.01); *H01M 4/622* (2013.01); *H01M 10/4235* (2013.01)

(58) Field of Classification Search
CPC ...... H01M 4/366; H01M 4/139; H01M 4/622; H01M 4/8605; H01M 4/861;
(Continued)

(56) References Cited

U.S. PATENT DOCUMENTS 5,387,479 A  2/1995  Koksbang
5,648,187 A  7/1997  Skotheim
(Continued)

FOREIGN PATENT DOCUMENTS

CN  103022413 A  4/2013
KR  101614885 B1  4/2016

OTHER PUBLICATIONS

Extended European Search Report for EP App. No. 18193134.6 mailed Dec. 20, 2018.
(Continued)

*Primary Examiner* — Helen Oi K Conley
*Assistant Examiner* — Amanda Rosenbaum
(74) *Attorney, Agent, or Firm* — Wolf, Greenfield & Sacks, P.C.

(57) ABSTRACT

Articles and methods involving protective membranes for electrochemical cells are generally provided. In some embodiments, a composite protective layer comprising particles and a polymeric binder may be disposed on an electroactive material. The particles may be reactive with lithium, may capable of intercalating lithium, and/or may comprise intercalated lithium. In some embodiments, the electroactive material may be in the form of a first electroactive layer, and a second electroactive layer may be disposed on the composite protective layer. Certain embodiments relate to activating a composite protective layer by intercalating lithium into particles within the layer and/or by reacting the particles with lithium metal.

23 Claims, 11 Drawing Sheets

(51) Int. Cl.
*H01M 4/139* (2010.01)
*H01M 4/62* (2006.01)
*H01M 10/42* (2006.01)

(58) Field of Classification Search
CPC .. H01M 4/8626; H01M 4/8647; H01M 4/628;
H01M 4/382; H01M 10/4235
See application file for complete search history.

(56) References Cited

U.S. PATENT DOCUMENTS

| | | | |
|---|---|---|---|
| 5,919,587 A | 7/1999 | Mukherjee et al. | |
| 5,961,672 A | 10/1999 | Skotheim et al. | |
| 6,001,139 A | 12/1999 | Asanuma et al. | |
| 6,238,821 B1 | 5/2001 | Mukherjee et al. | |
| 6,365,299 B1 | 4/2002 | Miyaki et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,755,268 B2 | 9/2017 | Fleischmann et al. | |
| 9,780,404 B2 | 10/2017 | Scordilis-Kelley et al. | |
| 9,825,328 B2 | 11/2017 | Du et al. | |
| 9,853,287 B2 | 12/2017 | Mikhaylik et al. | |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,020,479 B2 | 7/2018 | Mikhaylik et al. | |
| 10,020,512 B2 | 7/2018 | Gronwald et al. | |
| 10,050,308 B2 | 8/2018 | Liao et al. | |
| 10,069,135 B2 | 9/2018 | Fleischmann et al. | |
| 10,069,146 B2 | 9/2018 | Skotheim et al. | |
| 10,122,043 B2 | 11/2018 | Du et al. | |
| 2005/0196672 A1 | 9/2005 | Mukherjee et al. | |
| 2006/0115579 A1 | 6/2006 | Mukherjee et al. | |
| 2006/0121345 A1 | 6/2006 | Yasuda et al. | |
| 2006/0127773 A1* | 6/2006 | Kawakami | H01M 4/622 |
| | | | 29/623.5 |
| 2007/0221265 A1 | 9/2007 | Affinito et al. | |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2010/0239914 A1 | 9/2010 | Mikhaylik et al. | |
| 2011/0006738 A1 | 1/2011 | Mikhaylik et al. | |
| 2011/0014524 A1 | 1/2011 | Skotheim et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0177398 A1* | 7/2011 | Affinito | H01M 4/134 |
| | | | 429/231.95 |
| 2011/0206992 A1 | 8/2011 | Campbell et al. | |
| 2011/0256450 A1 | 10/2011 | Campbell et al. | |
| 2012/0003533 A1* | 1/2012 | Dahn | H01M 10/052 |
| | | | 252/519.33 |
| 2012/0048729 A1 | 3/2012 | Mikhaylik et al. | |
| 2012/0052339 A1 | 3/2012 | Mikhaylik et al. | |
| 2012/0052397 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2013/0164635 A1 | 6/2013 | Schmidt et al. | |
| 2013/0260207 A1* | 10/2013 | Uemura | H01M 4/604 |
| | | | 429/144 |
| 2013/0316072 A1 | 11/2013 | Scordilis-Kelley et al. | |
| 2014/0062411 A1 | 3/2014 | Mikhaylik et al. | |
| 2014/0079994 A1 | 3/2014 | Affinito et al. | |
| 2014/0123477 A1* | 5/2014 | Safont Sempere | H01M 4/0447 |
| | | | 29/623.5 |
| 2014/0127419 A1 | 5/2014 | Fleischmann et al. | |
| 2014/0127577 A1 | 5/2014 | Fleischmann et al. | |
| 2014/0186716 A1 | 7/2014 | Wu et al. | |
| 2014/0272565 A1 | 9/2014 | Gronwald et al. | |
| 2014/0272594 A1 | 9/2014 | Safont et al. | |
| 2014/0272595 A1 | 9/2014 | Cristadoro et al. | |
| 2014/0272597 A1 | 9/2014 | Mikhaylik et al. | |
| 2015/0010804 A1 | 1/2015 | Laramie et al. | |
| 2015/0044517 A1 | 2/2015 | Mikhaylik et al. | |
| 2015/0086837 A1 | 3/2015 | Laramie et al. | |
| 2015/0162586 A1 | 6/2015 | Fleischmann et al. | |
| 2015/0171430 A1 | 6/2015 | Engel et al. | |
| 2015/0180037 A1* | 6/2015 | Gronwald | C08F 12/30 |
| | | | 429/209 |
| 2015/0180084 A1 | 6/2015 | Scordilis-Kelley et al. | |
| 2015/0188194 A1 | 7/2015 | Mikhaylik et al. | |
| 2015/0221917 A1* | 8/2015 | Sakamoto | B32B 27/32 |
| | | | 429/249 |
| 2015/0236320 A1 | 8/2015 | Laramie et al. | |
| 2015/0236322 A1 | 8/2015 | Laramie et al. | |
| 2015/0280277 A1 | 10/2015 | Fleischmann et al. | |
| 2015/0287986 A1 | 10/2015 | Affinito et al. | |
| 2015/0287998 A1 | 10/2015 | Scordilis-Kelley et al. | |
| 2015/0318539 A1 | 11/2015 | Kelley et al. | |
| 2015/0349310 A1 | 12/2015 | Viner et al. | |
| 2016/0072132 A1* | 3/2016 | Liao | H01M 4/485 |
| | | | 429/50 |
| 2016/0118638 A1 | 4/2016 | Gronwald et al. | |
| 2016/0118651 A1* | 4/2016 | Kovalev | H01M 4/382 |
| | | | 429/213 |
| 2016/0301080 A1 | 10/2016 | Skotheim et al. | |
| 2016/0344067 A1 | 11/2016 | Laramie et al. | |
| 2017/0018815 A1 | 1/2017 | Laramie et al. | |
| 2017/0047590 A1 | 2/2017 | Mikhaylik et al. | |
| 2017/0062829 A1 | 3/2017 | Ryu et al. | |
| 2017/0141385 A1 | 5/2017 | Scordilis-Kelley et al. | |
| 2017/0141402 A1 | 5/2017 | Affinito et al. | |
| 2017/0141442 A1 | 5/2017 | Mikhaylik et al. | |
| 2017/0149086 A1 | 5/2017 | Du et al. | |
| 2017/0200975 A1 | 7/2017 | Liao et al. | |

(56) References Cited

U.S. PATENT DOCUMENTS

| | | |
|---|---|---|
| 2017/0250390 A1 | 8/2017 | Laramie et al. |
| 2017/0288208 A1 | 10/2017 | Kelley et al. |
| 2017/0317352 A1* | 11/2017 | Lee .................. H01M 10/0569 |
| 2017/0338475 A1 | 11/2017 | Laramie et al. |
| 2017/0352863 A1 | 12/2017 | Mikhaylik et al. |
| 2017/0365855 A1* | 12/2017 | Ryu ...................... H01M 4/366 |
| 2017/0373321 A1 | 12/2017 | Skotheim et al. |
| 2018/0006303 A1 | 1/2018 | Mikhaylik et al. |
| 2018/0034100 A1 | 2/2018 | Du et al. |
| 2018/0048018 A1 | 2/2018 | Scordilis-Kelley et al. |
| 2018/0138542 A1 | 5/2018 | Bunte et al. |
| 2018/0198162 A1 | 7/2018 | Du et al. |
| 2018/0212237 A1* | 7/2018 | Lee .................. H01M 10/0525 |
| 2018/0230610 A1 | 8/2018 | Laramie et al. |
| 2018/0254516 A1 | 9/2018 | Han et al. |
| 2018/0261820 A1 | 9/2018 | Liao et al. |
| 2018/0269520 A1 | 9/2018 | Scordilis-Kelley et al. |
| 2018/0277850 A1 | 9/2018 | Quero-Mieres et al. |
| 2018/0287122 A1 | 10/2018 | Mikhaylik et al. |
| 2018/0301697 A1 | 10/2018 | Affinito et al. |
| 2018/0337406 A1 | 11/2018 | Mudalige et al. |
| 2018/0342766 A1 | 11/2018 | Du et al. |
| 2018/0351148 A1 | 12/2018 | Schneider et al. |
| 2018/0351158 A1 | 12/2018 | Liao et al. |
| 2018/0358651 A1 | 12/2018 | Liao et al. |
| 2018/0375155 A1 | 12/2018 | Liao et al. |
| 2019/0006699 A1 | 1/2019 | Jones et al. |

OTHER PUBLICATIONS

Brunauer et al., Adsorption of Gases in Multimolecular Layers. J. Am. Chem. Soc. 1938;60:309-19.

Yan et al., Ultrathin Two-Dimensional Atomic Crystals as Stable Interfacial Layer for Improvement of Lithium Metal Anode. Nano Letters. 2014;14(10):6016-22. Epub Aug. 28, 2014.

Zhang et al., Magnetron sputtering amorphous carbon coatings on metallic lithium: Towards promising anodes for lithium secondary batteries. Journal of Power Sources. 2014;266:43-50. Epub May 14, 2014.

Zheng et al., Interconnected hollow carbon nanospheres for stable lithium metal anodes. Nature Nanotechnology. 2014;9:618-23. Epub Jul. 27, 2014.

International Search Report and Written Opinion for PCT/US2018/049911 mailed Mar. 13, 2019.

* cited by examiner

PROTECTIVE MEMBRANE FOR ELECTROCHEMICAL CELLS

RELATED APPLICATIONS

This application claims priority to U.S. Provisional Application No. 62/559,015, filed Sep. 15, 2017, which is incorporated herein by reference in its entirety.

FIELD

Articles and methods involving protective membranes for electrode structures are generally provided.

SUMMARY

Articles and methods involving protected electrode structures are generally provided. The subject matter disclosed herein involves, in some cases, interrelated products, alternative solutions to a particular problem, and/or a plurality of different uses of one or more systems and/or articles.

Certain embodiments relate to electrodes. In one embodiment, an electrode comprises an electroactive material comprising lithium metal and a composite protective layer comprising particles and a polymeric binder. The particles may comprise a material selected from the group consisting of lithium transition metal oxides, titanium oxides, nanographite, boron, boron carbide, silicon carbide, rare earth metal carbides, transition metal carbides, boron nitride, silicon nitride, rare earth metal nitrides, and transition metal nitrides.

In another embodiment, an electrode comprises a first electroactive layer, a composite protective layer adjacent the first electroactive layer, and a second electroactive layer adjacent the composite protective layer and positioned at a side of the composite protective layer opposite the first electroactive layer. The first electroactive layer may comprise a first electroactive material, and the first electroactive material may comprise lithium metal. The composite protective layer may comprise a polymeric binder and particles. The polymers may comprise a material that is reactive with lithium, is capable of intercalating lithium, and/or comprises intercalated lithium. The second electroactive layer may comprise a second electroactive material, and the second electroactive material may comprise lithium metal.

Certain embodiments relate to methods of forming an electrode. In one embodiment, a method comprises forming a structure comprising an electroactive material comprising lithium metal and a composite protective layer, and activating the composite protective layer by intercalating lithium into the particles and/or reacting the particles with the lithium metal in the electroactive material. The composite protective layer may comprise particles and a polymeric binder. The particles may comprise a material that is reactive with lithium and/or is capable of intercalating lithium. In some embodiments, the composite protective layer includes less than 70 wt % lithium.

In another embodiment, a method comprises depositing, onto a first layer, particles and a polymeric binder to form a composite protective layer and depositing an electroactive material comprising lithium metal on the composite protective layer. The composite protective layer may comprise particles reactive with lithium and/or capable of intercalating lithium.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
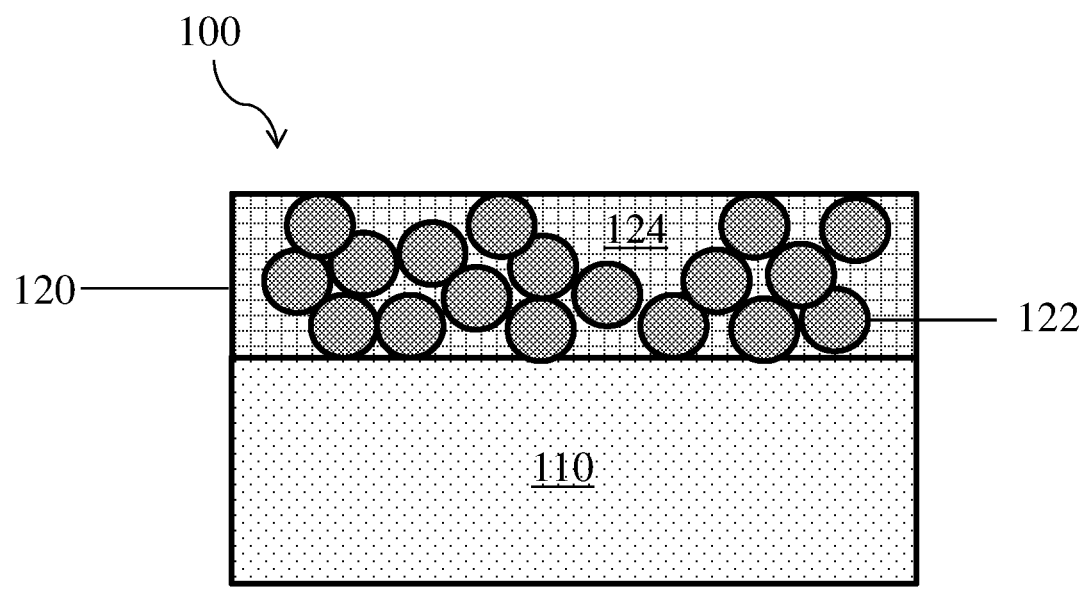
FIG. 1 shows an exemplary electrode comprising an electroactive material and a composite protective layer.

Articles and methods related to electrodes comprising composite protective layers are generally provided. The composite protective layers may be disposed on an electroactive material and/or positioned between two electroactive material layers. In some embodiments, a composite protective layer may protect an electroactive material on which it is disposed by, for example, reducing or preventing deleterious interactions of the electroactive material with an electrolyte in an electrochemical cell. In some embodiments, the composite protective layer may be relatively impermeable to the electrolyte, and/or may eliminate or substantially reduce exposure of an electroactive material on which it is disposed to the electrolyte. Certain embodiments relate to composite protectives layer with one or more other beneficial properties, such as having a low area-specific impedance, forming a stable solid electrolyte interface (SEI) with an electrolyte, promoting an even distribution of current at an electroactive material on which it is disposed, increasing the cycle life of an electrochemical cell in which it is positioned, and/or reducing plating through a separator present in an electrochemical cell in which it is positioned.

In some embodiments, a composite protective layer as described herein comprises particles. The particles may comprise a material that is reactive with lithium, is capable of intercalating lithium, and/or comprises intercalated lithium. In some embodiments, the particles do not initially comprise lithium, or initially comprise lithium in a relatively low amount. The composite protective layer may be "activated" (e.g., become lithium-ion conductive, or more lithium-ion conductive than prior to activation) by intercalation of lithium into the particles and/or by reaction of lithium with the particles such that the composite protective layer comprises (more) lithium or becomes (more) lithium-ion conductive at the conclusion of the activation process. Activation of the particles by intercalation of lithium from a layer or material to which it is adjacent (e.g., an electroactive layer, an electroactive material) may result in an activated composite protective structure with one or more advantages certain existing protective structures, such as composite layers that are deposited in an activated form. These advantages may include a more even current distribution, enhanced flexibility, and/or reduced brittleness. In some cases, it may be easier or more cost effective to deposit and/or process an unactivated composite protective layer on a layer or electroactive material than to deposit and/or process an activated composite protective layer. Accordingly, it may be possible, easier and/or more cost effective to employ particles with a wider variety of chemical compositions and/or sizes, and/or to control the thickness of the composite protective layer using the methods and articles described herein compared to certain existing methods or articles.

In some embodiments, particles in a composite protective layer may comprise one or more of a lithium transition metal oxide, titanium oxide, nanographite, boron, boron carbide, silicon carbide, a rare earth metal carbide, a transition metal carbide, boron nitride, silicon nitride, a rare earth metal nitride, and a transition metal nitride. These species may be particularly suitable for intercalating and/or reacting with lithium to form a composite protective layer with beneficial properties as described herein.

Certain embodiments relate to the formation of electrodes comprising composite protective layers. For instance, some embodiments may involve forming an electrode by depositing a composite protective layer onto a first layer. The first layer may be an electroactive layer, or it may be a non-electroactive layer. In some embodiments, an electroactive layer may be deposited onto a composite protective layer.

As described above, some embodiments are related to electrodes comprising composite protective layers. FIG. 1 shows one non-limiting embodiment of an electrode 100 comprising an electroactive material 110 and a composite protective layer 120. Composite protective layer 120 further comprises particles 122 and a polymeric binder 124. In some embodiments, the electroactive material may be in the form of a layer.

It should be appreciated that the figures shown in herein are exemplary and that other embodiments may have a different configuration or arrangement of components. For example, in some embodiments the electroactive material may be thicker than the composite protective layers as is shown in FIG. 1, while in other embodiments the electroactive layer may have a similar thickness to the composite protective layer, or may be thinner than the composite protective layer.

In some embodiments, the introduction of lithium into the particles within a composite protective layer may be enhanced by directly contacting an electroactive material comprising lithium with particles in the composite protective layer. Accordingly, in some embodiments the particles in the composite protective layer are in direct contact with the electroactive material, which may facilitate the activation (e.g., intercalation, reaction) process.

As also described above, in some embodiments a composite protective layer and/or particles therein may include a relatively low amount of lithium (e.g., prior to activation). For example, lithium may make up less than or equal to 70 wt % of the composite protective layer, less than or equal to 60 wt % of the composite protective layer, less than or equal to 50 wt % of the composite protective layer, less than or equal to 40 wt % of the composite protective layer, less than or equal to 30 wt % of the composite protective layer, less than or equal to 20 wt % of the composite protective layer, or less than or equal to 10 wt % of the composite protective layer. In some embodiments, lithium may make up greater than or equal to 0 wt % of the composite protective layer, greater than or equal to 10 wt % of the composite protective layer, greater than or equal to 20 wt % of the composite protective layer, greater than or equal to 30 wt % of the composite protective layer, greater than or equal to 40 wt % of the composite protective layer, greater than or equal to 50 wt % of the composite protective layer, or greater than or equal to 60 wt % of the composite protective layer. Combinations of the above-referenced ranges are also possible (e.g., less than or equal to 70 wt % of the composite protective layer and greater than or equal to 0 wt % of the composite protective layer). Other ranges are also possible. The ranges above should be understood to refer to the solid portions of the composite protective layer (e.g., any binder, particles, and/or solid additives).

In some embodiments, lithium may make up less than or equal to 70 wt % of the particles in the composite protective layer, less than or equal to 60 wt % of the particles in the composite protective layer, less than or equal to 50 wt % of the particles in the composite protective layer, less than or equal to 40 wt % of the particles in the composite protective layer, less than or equal to 25 wt % of the particles in the composite protective layer, or less than or equal to 10 wt % of the particles in the composite protective layer. In some embodiments, lithium may make up greater than or equal to 0 wt % of the particles in the composite protective layer, greater than or equal to 10 wt % of the particles in the composite protective layer, greater than or equal to 25 wt % of the particles in the composite protective layer, greater than or equal to 40 wt % of the particles in the composite protective layer, greater than or equal to 50 wt % of the particles in the composite protective layer, or greater than or equal to 60 wt % of the particles in the composite protective layer. Combinations of the above-referenced ranges are also possible (e.g., less than or equal to 70 wt % of the particles in the composite protective layer and greater than or equal to 0 wt % of the particles in the composite protective layer, or less than or equal to 70 wt % of the particles in the composite protective layer and greater than or equal to 25 wt % of the particles in the composite protective layer). Other ranges are also possible.

Without wishing to be bound by theory, it is believed that a lower amount of lithium in the composite protective layer correlates with a low lithium ion conductivity of the composite protective layer (e.g., prior to activation of the composite protective layer). In some such cases, the lithium ion conductivity of the composite protective layer may be less than or equal to $10^{-7}$ S/cm, less than or equal to $10^{-8}$ S/cm, or less than or equal to $10^{-9}$ S/cm. In some embodiments, the lithium ion conductivity of composite protective layer may be greater than or equal to $10^{-10}$ S/cm, greater than or equal to $10^{-9}$ S/cm, or greater than or equal to $10^{-8}$ S/cm. Combinations of the above-referenced ranges are also possible (e.g., greater than or equal to $10^{-10}$ S/cm and less than or equal to $10^{-7}$ S/cm). Other ranges are also possible.

The electronic conductivity of the composite protective layer is measured by electrochemical impedance spectroscopy (EIS), and is measured in a direction corresponding to the direction through which ions are transported through the composite protective layer during operation of the electrochemical cell. In some cases, electrochemical impedance spectroscopy conductivity measurements are made by assembling a cell in which the layer that is being measured (such as, e.g., the composite protective layer) is positioned between two electronically conductive substrates. In other cases, such as for layers which may be challenging to isolate from an electrochemical cell, electrochemical impedance spectroscopy conductivity measurements are made on an electrochemical cell including layer of interest and of an otherwise equivalent electrochemical cell lacking the layer of interest. In such cases, the measured impedance attributable to the layer of interest is determined by subtracting the measured impedance of the electrochemical cell lacking the layer of interest from the electrochemical cell including the layer of interest. The complex impedance across the layer (which has known dimensions) or cell is determined by passing a 5 mV alternating voltage across the electronically conductive substrates versus an open circuit voltage and measuring the real and imaginary impedance between the electronically conductive substrates as a function of frequency between 100 kHz and 20 mHz. Layers which have both electrical and lithium ion conductivity will typically display a low frequency relaxation arising from electronic conductivity and a high frequency relaxation arising from both electronic and lithium ion conductivity. The low frequency relaxation may be used to determine the electrical resistance of the layer, from which the electrical conductivity can be calculated based on the geometry of the layer. The high frequency relaxation may then be used to determine the lithium ion conductivity of the layer by assuming that the ionic resistance of the layer and the electronic resistance of the layer act in parallel and then calculating the ionic resistance that would give rise to the measured high frequency relaxation. The lithium ion conductivity may then be determined based on geometry of the layer. In this context, the geometry across which the electronic conductivity is measured is calculated using the geometric surfaces of the layer. The geometric surfaces of a layer would be understood by those of ordinary skill in the art as referring to the surfaces defining the outer boundaries of the layer, for example, the area that may be measured by a macroscopic measuring tool (e.g., a ruler), and do not include the internal surface area (e.g., area within pores of a porous material such as a porous membrane separator, etc.).

In some embodiments, a composite protective layer and/or particles therein may contain a relatively high amount of lithium. For instance, the particles of the composite protective layer may be particles that contain lithium in a relatively high amount prior to reacting with and/or intercalating lithium, and/or lithium may have intercalated into and/or reacted with particles that initially included lithium in a relatively low amount. In some embodiments, lithium may make up greater than or equal to 75 wt % of the composite protective layer, greater than or equal to 80 wt % of the composite protective layer, greater than or equal to 85 wt % of the composite protective layer, or greater than or equal to 90 wt % of the composite protective layer. In some embodiments, lithium may make up less than or equal to 95 wt % of the composite protective layer, less than or equal to 90 wt % of the composite protective layer, less than or equal to 85 wt % of the composite protective layer, or less than or equal to 80 wt % of the composite protective layer. Combinations of the above-referenced ranges are also possible (e.g., greater than or equal to 75 wt % and less than or equal to 95 wt % of the composite protective layer). Other ranges are also possible.

In some embodiments, lithium may make up greater than or equal to 75 wt % of the particles in the composite protective layer, greater than or equal to 78 wt % of the particles in the composite protective layer, greater than or equal to 80 wt % of the particles in the composite protective layer, greater than or equal to 82 wt % of the particles in the composite protective layer, greater than or equal to 84 wt % of the particles in the composite protective layer, greater than or equal to 85 wt % of the particles in the composite protective layer, greater than or equal to 88 wt % of the particles in the composite protective layer, greater than or equal to 90 wt % of the particles in the composite protective layer, greater than or equal to 92 wt % of the particles in the composite protective layer, greater than or equal to 94 wt % of the particles in the composite protective layer, greater than or equal to 96 wt % of the particles in the composite protective layer, or greater than or equal to 97 wt % of the particles in the composite protective layer. In some embodiments, lithium may make up less than or equal to 98 wt % of the particles in the composite protective layer, less than or equal to 97 wt % of the particles in the composite protective layer, less than or equal to 96 wt % of the particles in the composite protective layer, less than or equal to 94 wt % of the particles in the composite protective layer, less than or equal to 92 wt % of the particles in the composite protective layer, less than or equal to 90 wt % of the particles in the composite protective layer, less than or equal to 88 wt % of the particles in the composite protective layer, less than or equal to 85 wt % of the particles in the composite protective layer, less than or equal to 84 wt % of the particles in the composite protective layer, less than or equal to 82 wt % of the particles in the composite protective layer, less than or equal to 80 wt % of the particles in the composite protective layer, or less than or equal to 78 wt % of the particles in the composite protective layer. Combinations of the above-referenced ranges are also possible (e.g., greater than or equal to 75 wt % of the particles in the composite protective layer and less than or equal to 98 wt % of the particles in the composite protective layer, greater than or equal to 75 wt % of the particles in the composite protective layer and less than or equal to 97 wt % of the particles in the composite protective layer, or greater than or equal to 75 wt % of the particles in the composite protective layer and less than or equal to 84 wt % of the particles in the composite protective layer). Other ranges are also possible.

In some cases, the lithium ion conductivity of the composite protective layer (e.g., after activation) may be greater than or equal to $10^{-5}$ S/cm, greater than or equal to $10^{-4}$ S/cm, greater than or equal to $10^{-3}$ S/cm, greater than or equal to $10^{-2}$ S/cm, or greater than or equal to $10^{-1}$ S/cm. In some embodiments, the lithium ion conductivity of the particles in the composite layer may be less than or equal to $10^{0}$ S/cm, less than or equal to $10^{-1}$ S/cm, less than or equal to $10^{-2}$ S/cm, less than or equal to $10^{-3}$ S/cm, or less than or equal to $10^{-4}$ S/cm. Combinations of the above-referenced ranges are also possible (e.g., greater than or equal to $10^{-5}$ S/cm and less than or equal to $10^{0}$ S/cm). Other ranges are also possible.

In some embodiments, the amount of lithium in a composite protective layer may change by a relatively large amount during an activation process. The amount of lithium in a composite protective layer may increase by greater than or equal to 5%, greater than or equal to 10%, greater than or equal to 20%, greater than or equal to 50%, greater than or equal to 100%, greater than or equal to 200%, greater than or equal to 500%, greater than or equal to 1000%, greater than or equal to 2000%, or greater than or equal to 5000% during an activation process. The amount of lithium in a composite protective layer may increase by less than or equal to 10000%, less than or equal to 5000%, less than or equal to 2000%, less than or equal to 1000%, less than or equal to 500%, less than or equal to 200%, less than or equal to 100%, less than or equal to 50%, less than or equal to 20%, or less than or equal to 10% during an activation process. Combinations of the above-referenced ranges are also possible (e.g., greater than or equal to 5% and less than or equal to 10000%). Other ranges are also possible. As used herein, the percent change in the amount of lithium in the composite layer refers to the ratio of the increase in the weight of lithium in the composite protective layer to the initial weight of lithium in the composite protective layer. The percent change in the amount of lithium in the composite protective layer may be determined using X-ray photoelectron spectroscopy.

In some embodiments, a relatively large amount of lithium may be added to the composite protective layer during an activation process. The added lithium may be a large fraction of the initial mass of the composite protective layer. In some embodiments, the amount of lithium added during an activation process may be greater than or equal to 0.5% of the initial mass of the composite protective structure, greater than or equal to 1% of the initial mass of the composite protective structure, greater than or equal to 2% of the initial mass of the composite protective structure, greater than or equal to 5% of the initial mass of the composite protective structure, greater than or equal to 10% of the initial mass of the composite protective structure, greater than or equal to 15% of the initial mass of the composite protective structure, greater than or equal to 20% of the initial mass of the composite protective structure, or greater than or equal to 25% of the initial mass of the composite protective structure. In some embodiments, the amount of lithium added during an activation process may be less than or equal to 30% of the initial mass of the composite protective structure, less than or equal to 25% of the initial mass of the composite protective structure, less than or equal to 20% of the initial mass of the composite protective structure, less than or equal to 15% of the initial mass of the composite protective structure, less than or equal to 10% of the initial mass of the composite protective structure, less than or equal to 5% of the initial mass of the composite protective structure, less than or equal to 2% of the initial mass of the composite protective structure, or less than or equal to 1% of the initial mass of the composite protective structure. Combinations of the above-referenced ranges are also possible (e.g., greater than or equal to 1% and less than or equal to 30%, or greater than or equal to 2% and less than or equal to 15%). Other ranges are also possible. The amount of lithium added to the composite protective layer may be determined using X-ray photoelectron spectroscopy.

In some embodiments, the amount of lithium in particles within a composite protective layer may change by a relatively large amount during an activation process. The amount of lithium in the particles within a composite protective layer may increase by greater than or equal to 5%, greater than or equal to 10%, greater than or equal to 20%, greater than or equal to 50%, greater than or equal to 100%, greater than or equal to 200%, greater than or equal to 500%, greater than or equal to 1000%, greater than or equal to 2000%, or greater than or equal to 5000% during an activation process. The amount of lithium in the particles within a composite protective layer may increase by less than or equal to 10000%, less than or equal to 5000%, less than or equal to 2000%, less than or equal to 1000%, less than or equal to 500%, less than or equal to 200%, less than or equal to 100%, less than or equal to 50%, less than or equal to 20%, or less than or equal to 10% during an activation process. Combinations of the above-referenced ranges are also possible (e.g., greater than or equal to 5% and less than or equal to 10000%). Other ranges are also possible. As used herein, the percent change in the amount of lithium in the particles within the composite layer refers to the ratio of the increase in the weight of lithium in the particles within the composite protective layer to the initial weight of lithium in the particles within the composite protective layer. The percent change in the amount of lithium in the particles within the composite protective layer may be determined using X-ray photoelectron spectroscopy.

In some embodiments, the amount of lithium added to particles within a composite protective layer may be relatively high. The amount of lithium added to the particles may be greater than or equal to 2% of the initial mass of the particles, greater than or equal to 5% of the initial mass of the particles, greater than or equal to 10% of the initial mass of the particles, greater than or equal to 20% of the initial mass of the particles, greater than or equal to 33% of the initial mass of the particles, greater than or equal to 50% of the initial mass of the particles, greater than or equal to 100% of the initial mass of the particles, greater than or equal to 200% of the initial mass of the particles, greater than or equal to 300% of the initial mass of the particles, greater than or equal to 500% of the initial mass of the particles, greater than or equal to 1000% of the initial mass of the particles, greater than or equal to 2000% of the initial mass of the particles, greater than or equal to 5000% of the initial mass of the particles, greater than or equal to 10000% of the initial mass of the particles, or greater than or equal to 20000% of the initial mass of the particles. The amount of lithium added to the particles may be less than or equal to 49000% of the initial mass of the particles, less than or equal to 20000% of the initial mass of the particles, less than or equal to 10000% of the initial mass of the particles, less than or equal to 5000% of the initial mass of the particles, less than or equal to 2000% of the initial mass of the particles, less than or equal to 1000% of the initial mass of the particles, less than or equal to 500% of the initial mass of the particles, less than or equal to 300% of the initial mass of the particles, less than or equal to 200% of the initial mass of the particles, less than or equal to 100% of the initial mass of the particles, less than or equal to 50% of the initial mass of the particles, less than or equal to 33% of the initial mass of the particles, less than or equal to 20% of the initial mass of the particles, less than or equal to 10% of the initial mass of the particles, or less than or equal to 5% of the initial mass of the particles. Combinations of the above-referenced ranges are also possible (e.g., greater than or equal to 2% and less than or equal to 98%, or greater than or equal to 33% and less than or equal to 300%). Other ranges are also possible. The amount of lithium added to the composite particles may be determined using X-ray photoelectron spectroscopy.

In some embodiments, the lithium ion conductivity of a composite protective layer may change by a relatively large amount during an activation process. The lithium ion conductivity of the composite protective layer may increase by greater than or equal to 5%, greater than or equal to 10%, greater than or equal to 20%, greater than or equal to 50%, greater than or equal to 100%, greater than or equal to 200%, greater than or equal to 500%, greater than or equal to 1000%, greater than or equal to 2000%, or greater than or equal to 5000% during an activation process. The lithium ion conductivity of the composite protective layer may increase by less than or equal to 10000%, less than or equal to 5000%, less than or equal to 2000%, less than or equal to 1000%, less than or equal to 500%, less than or equal to 200%, less than or equal to 100%, less than or equal to 50%, less than or equal to 20%, or less than or equal to 10% during an activation process. Combinations of the above-referenced ranges are also possible (e.g., greater than or equal to 5% and less than or equal to 10000%). Other ranges are also possible. The lithium ion conductivity of the composite protective layer may be determined by using EIS as described herein.

As shown illustratively in FIG. 1, the composite protective layer may comprise a polymeric binder 124. In some embodiments, the polymeric binder may increase the protective properties of the composite protective layer. For example, the polymeric binder may be relatively insoluble in common electrolytes such as electrolytes that include aprotic solvents, and/or may swell to a relatively low degree in common electrolytes such as electrolytes that include aprotic solvents. The polymeric binder may have any suitable composition as described in more detail below.

In some embodiments, upon or after exposure of the composite protective layer to an electrolyte, a stable solid electrolyte interface layer may be formed, as described in more detail below.

Figure 2:
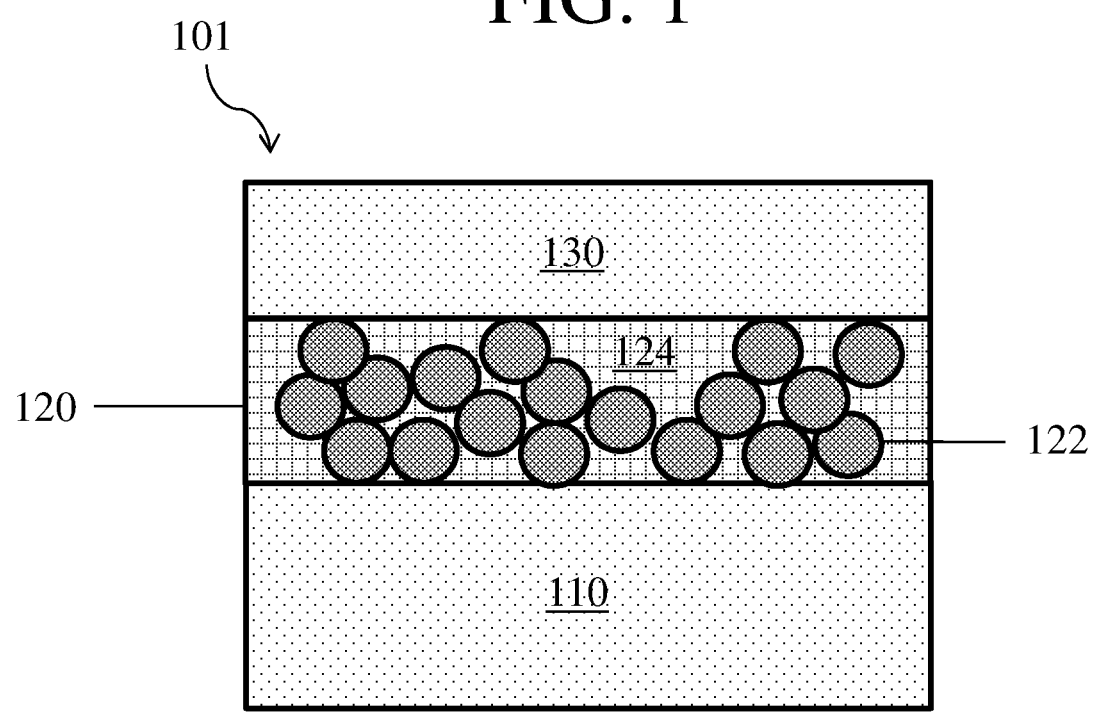
FIG. 2 shows an exemplary electrode comprising a composite protective layer positioned between two electroactive layers.

In some embodiments, a composite protective layer may be positioned between two electroactive layers, or a second electroactive layer may be positioned on a side of the composite protective layer opposite a first electroactive layer. One example of a structure having this configuration is shown in FIG. 2, where electrode 101 comprises composite protective layer 120 that is adjacent both first electroactive layer 110 and second electroactive layer 130. Composite protective layer 120 comprises particles 122 and polymeric binder 124. As described above, the relationship between the thicknesses of the composite protective layer, first electroactive layer, and second electroactive layer shown in FIG. 2 should not be taken to be limiting. These three layers may have similar thicknesses, may have different thicknesses, and may have any suitable rank ordering of thicknesses with respect to each other.

A layer (e.g., an electrode, a protected electrode structure) referred to as being "disposed on," "disposed between," "on," or "adjacent" another layer (s) means that it can be directly disposed on, directly disposed between, directly on, or directly adjacent the layer (s); or, an intervening layer may also be present between the two layers. For example, a layer (e.g., a protective structure) described herein that is adjacent an electrode may be directly adjacent (e.g., may be in direct physical contact with) the electrode, or an intervening layer may be positioned between the electrode and the layer. A layer that is "directly adjacent," "directly on," or "in contact with," another layer means that no intervening layer is present. It should also be understood that when a layer is referred to as being "disposed on," "disposed between," "on," or "adjacent" another layer (s), it may be disposed on, disposed between, on, or adjacent the entire layer (s) or disposed on, disposed between, on, or adjacent a part of the layer(s).

In some embodiments, an electrode may initially have a structure comprising two electroactive layers (e.g., similar to that shown in FIG. 2), but may eventually have a structure comprising a single electroactive layer (e.g., similar to that shown in FIG. 1). In some embodiments, this change in structure may take place prior to cycling of the cell. In some embodiments, an electrode may have a structure comprising two electroactive layers and may be positioned in an electrochemical cell that has been cycled fewer than 10 times, fewer than 8 times, fewer than 6 times, fewer than 4 times, or fewer than 2 times. An electrode may transition from a structure in which a composite protective layer is positioned between two electroactive layers (e.g., a first electroactive layer and a second electroactive layer) to a structure in which the composite protective layer is not positioned between two electroactive layers by, for example, intercalation of one of the electroactive layers (e.g., the second electroactive layer) into the composite protective layer (and/or any particles therein) and/or reaction of one of the electroactive layers (e.g., the second electroactive layer) with the composite protective layer (and/or any particles therein). Stated differently, in an electrode that initially comprises a composite protective layer and at least two electroactive layers (e.g., at least a first electroactive layer and a second electroactive layer), one of the electroactive layers (e.g., the second electroactive layer) may intercalate (e.g., completely) into and/or react (e.g., completely) with the composite protective layer (and/or any particles therein) to form an electrode including one electroactive layer (e.g., the first electroactive layer) and one composite protective layer comprising lithium that originated from the other electroactive layer (e.g., lithium that originated from the second electroactive layer). It should be understood that the disappearance of one electroactive layer (e.g., the second electroactive layer) from an electrode does not necessarily imply that the other electroactive layer (e.g., the first electroactive layer) is not also serving as a source of lithium that may intercalate into and/or react with the composite protective layer (and/or any particles therein). In fact, as will be described further below, it may be possible for two electroactive layers surrounding a composite protective layer to each intercalate lithium into and/or react with the composite protective layer.

Figure 3:
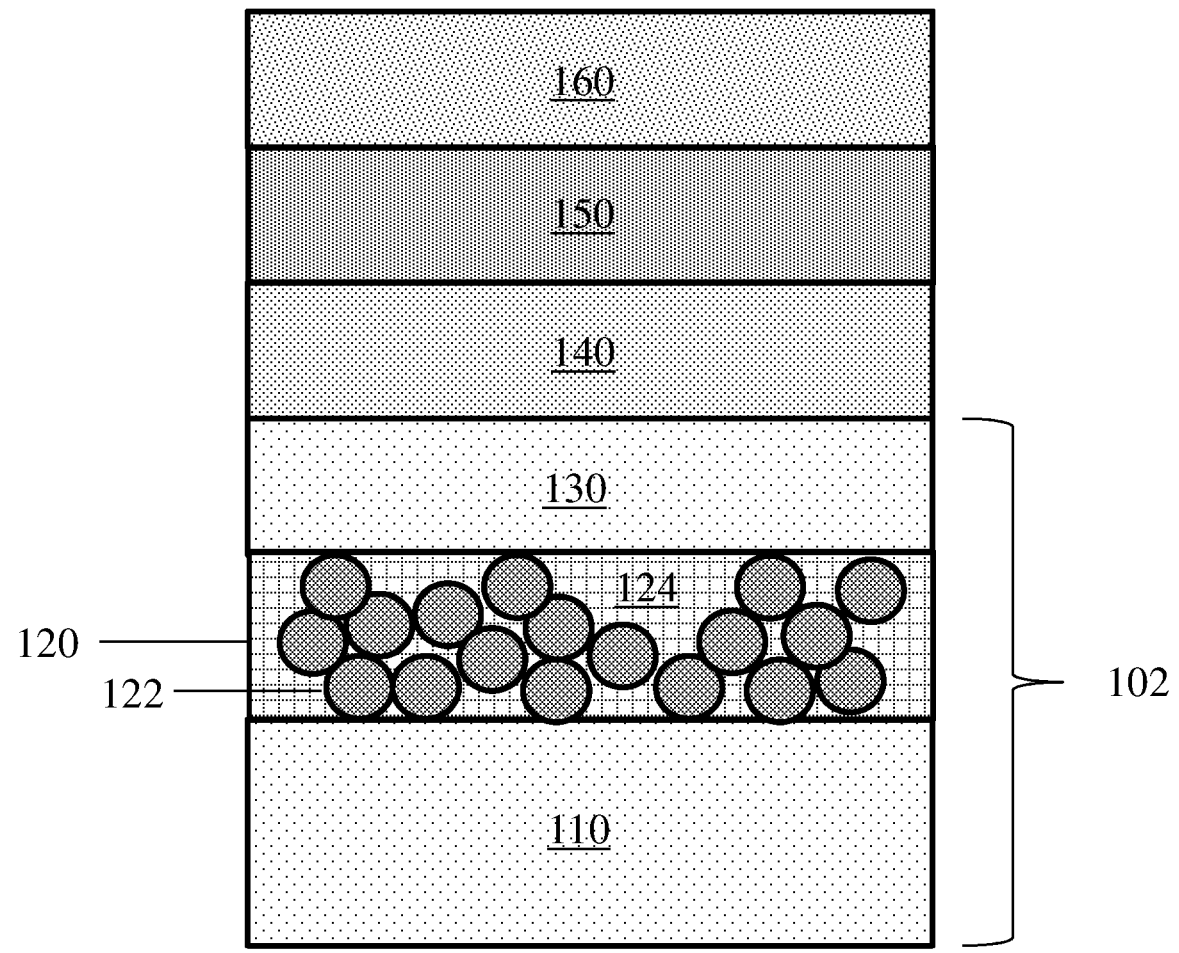
FIG. 3 shows an exemplary electrochemical cell comprising multiple layers.

In some embodiments, an electrode may be present in an electrochemical cell that further comprises additional electrochemical cell layers. FIG. 3 shows one non-limiting embodiment of an electrochemical cell that comprises electrode 102 and layers 140, 150, and 160. In some embodiments, layer 140 is an electrolyte (e.g., a gel polymer electrolyte), layer 150 is a separator, and layer 160 is a second electrode. It should be appreciated that some, all, or none of these layers may be present, and if present may be arranged in any order with respect to each other.

It should also be understood that while electrode 102 is shown in FIG. 3 as including two electroactive layers, in some embodiments an electrode comprising a composite protective layer described herein that includes only one electroactive layer may be present in an electrochemical cell. Similarly, it should be understood that in some embodiments an electrode as described herein may be included in an electrochemical cell that further comprises three layers, while in other embodiments it may be included in an electrochemical cell that further comprises one layer, two layers, four layers, five layers, or more layers. In some embodiments, an electrode may be an outermost layer in the electrochemical cell, while in other embodiments the electrode may be positioned between two layers in the electrochemical cell. Non-limiting examples of additional layers include support layers, separators, electrodes, electrolytes, electroactive layers, and current collectors. In some embodiments, the one or more layers may be positioned between a first electrode (e.g., an electrode comprising a composite protective layer) and a second electrode (e.g., a counter electrode).

Figure 4:
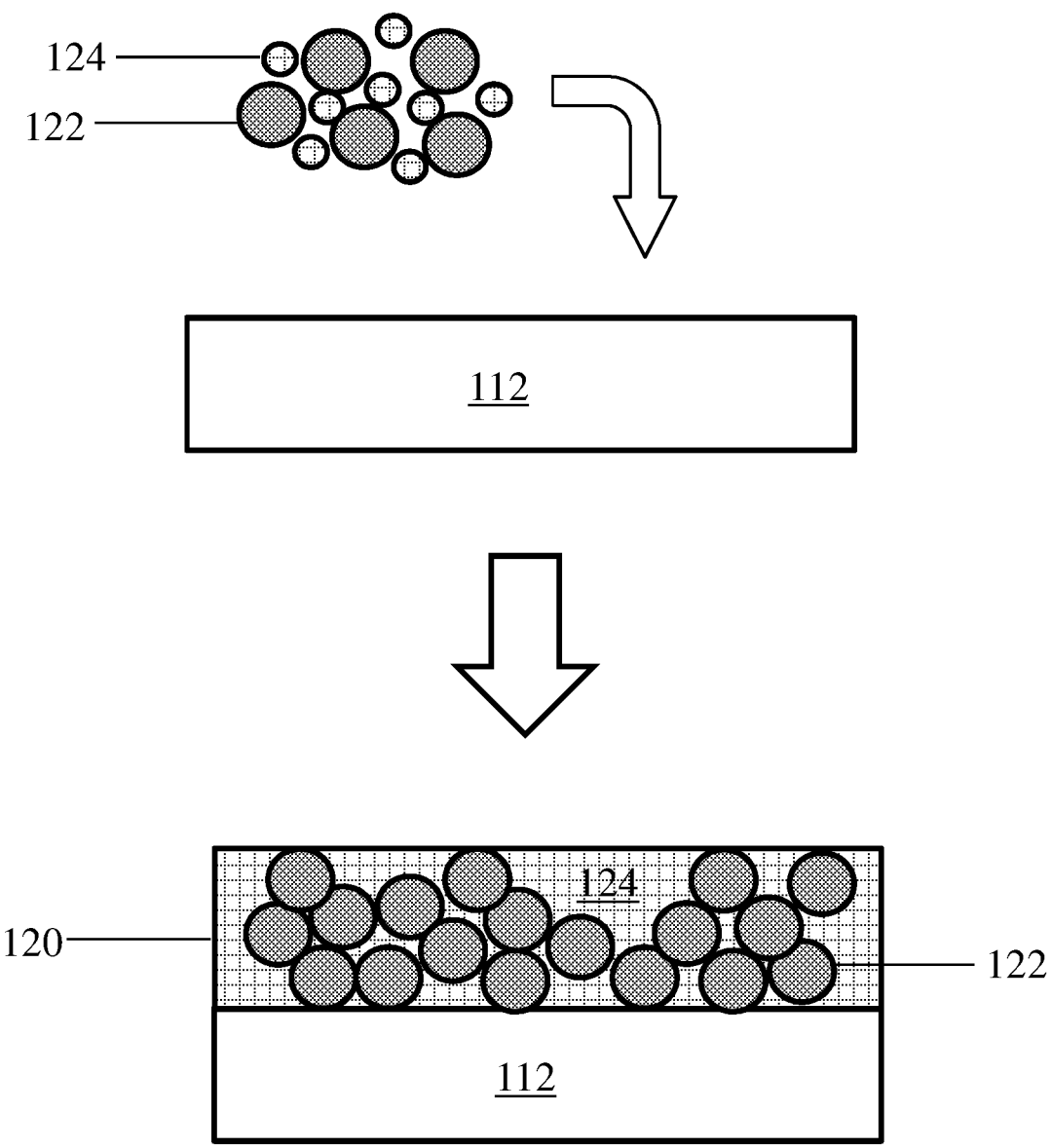
FIG. 4 shows an exemplary method of forming a composite protective layer.

As described herein, certain embodiments relate to methods of forming electrodes and composite protective layers. FIG. 4 shows one non-limiting embodiment of a method for making a composite protective layer. In FIG. 4, particles 122 and polymeric binder 124 are deposited onto layer 112 to form composite protective layer 120. In some embodiments, the polymeric binder may be deposited onto a layer while in the form of droplets (e.g., liquid droplets) and/or particles, as is shown illustratively in FIG. 4. In certain embodiments, the polymeric binder may be deposited onto a layer from a liquid not in the form of droplets (e.g., as a uniform film, such as would be produced by Mayer rod coating and/or doctor blade coating). The particles and binder may be deposited by any suitable means. In some embodiments, the particles and binder are deposited from a slurry using one or more of air brushing, Mayer rod, doctor blading, aerosol deposition, spin coating, dip coating, inkjet printing, and silk screen printing techniques.

In some but not necessarily all embodiments, layer 112 in FIG. 4 may be an electroactive layer. In some such embodiments, the composite protective layer may be deposited onto a first electroactive layer, and a second electroactive layer may be deposited onto the composite protective layer (e.g., on a side of the composite protective layer opposite the first electroactive layer). In other embodiments, layer 112 may be a support layer, a separator, or another layer. As an example, the composite protective layer may be deposited onto a separator or a support layer, and then an electroactive material or layer may be deposited onto the composite protective layer.

Figure 5:
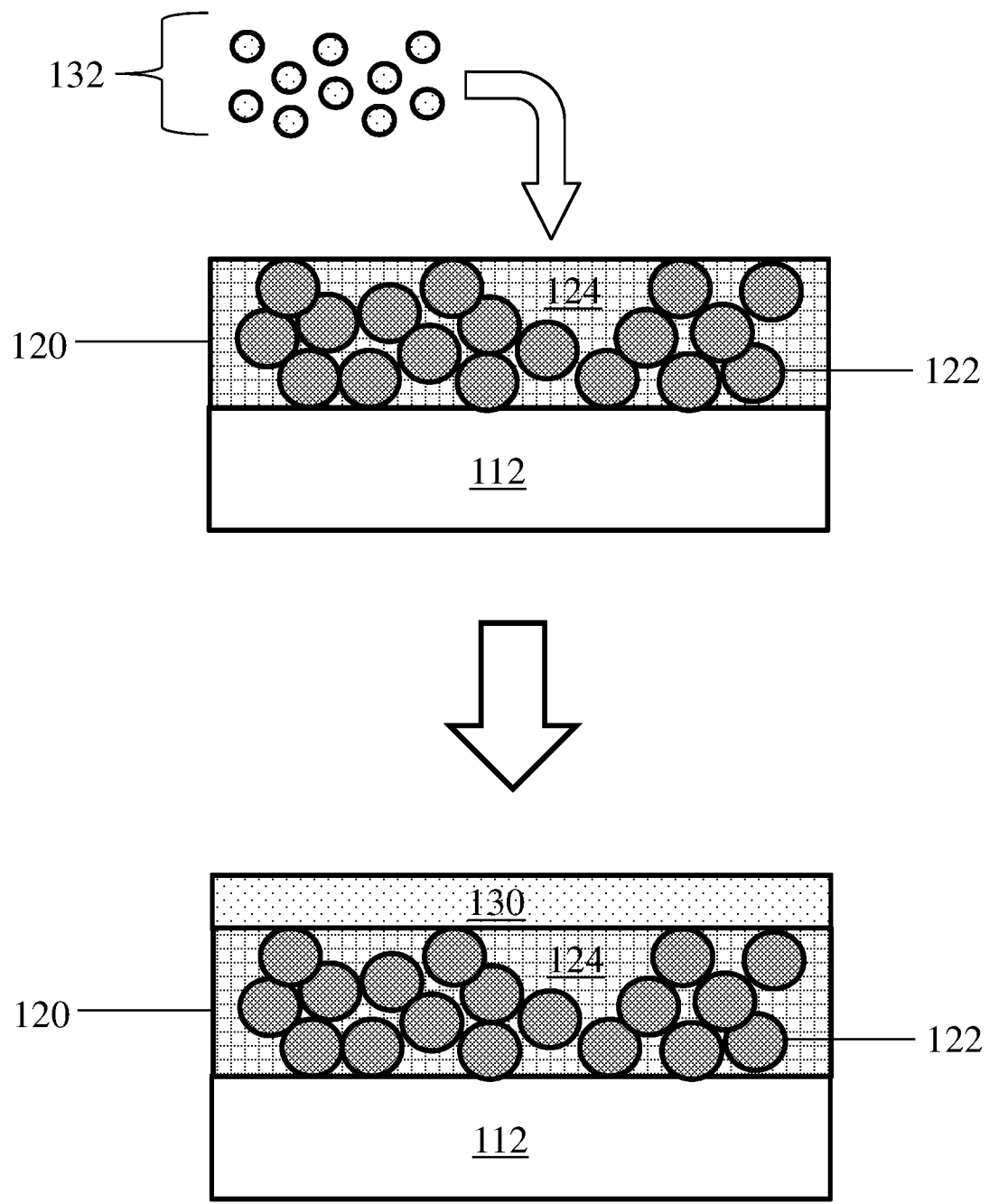
FIG. 5 shows an exemplary method of depositing an electroactive layer on a composite protective layer.

As also described above, in certain embodiments an electroactive material or layer may be deposited onto a composite protective layer. FIG. 5 shows an example of this step, where electroactive material 132 is deposited onto composite protective layer 120 to form electroactive material 130. In some embodiments, the electroactive material is in the form of a vapor and vapor deposition techniques (e.g., vacuum vapor deposition techniques) are employed to deposit the electroactive material or layer. For example, the electroactive material may be lithium metal and may be deposited from a vapor comprising lithium metal. In some embodiments, a second electroactive layer may be added to an electrode as described herein by lamination. For example, a first electroactive layer disposed on a composite protective layer may be laminated to a second electroactive layer.

Figure 6:
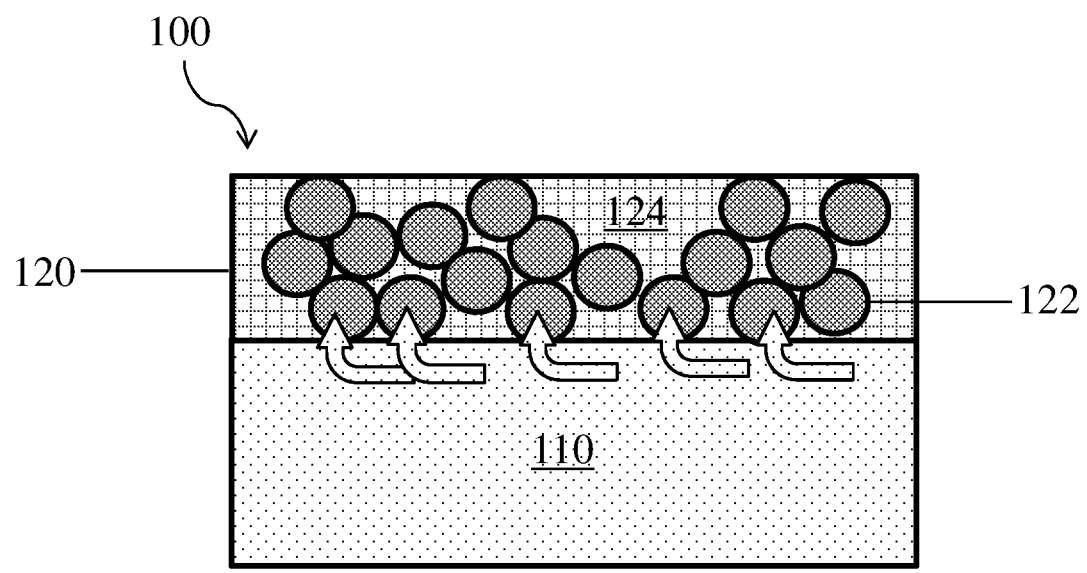
FIGS. 6-7 show exemplary methods of intercalating and/or reacting an electroactive material with particles in a composite protective layer.

In some embodiments, a method as described herein may comprise activating a composite protective layer and/or may comprise increasing the lithium ion conductivity of a composite protective layer. The composite protective layer may be activated by, for example, intercalating lithium into particles within the composite protective layer and/or reacting particles within the composite protective layer with the lithium metal in the electroactive material or layer. The lithium that intercalates into the particles of the composite protective layer and/or reacts with the particles of the composite protective layer may originate from an electroactive material or layer (e.g., a first electroactive layer, a second electroactive layer), or it may originate from another source (e.g., an electrolyte in contact with the protective layer or permeating the protective layer, one or more particles comprising lithium embedded in the composite protective layer). After intercalation, the lithium may be in metallic form (e.g., as metallic lithium), and/or may be in ionic form (e.g., as lithium cations). References to intercalated lithium, absent description otherwise should be understood to refer to any, some, or all of metallic lithium, ionic lithium, and combinations of metallic lithium with ionic lithium in any proportion. FIG. 6 shows one non-limiting an embodiment of a method in which lithium from electroactive material 110 intercalates into and/or reacts with particles 122 in composite protective layer 120. Intercalation into and/or reaction of lithium with the composite protective layer and/or any particles therein may occur upon formation of the composite protective layer, upon deposition of an electroactive layer onto the composite protective layer, during cell assembly, and/or during cell cycling. Reaction of the lithium with the particles may comprise a redox reaction.

Figure 7:
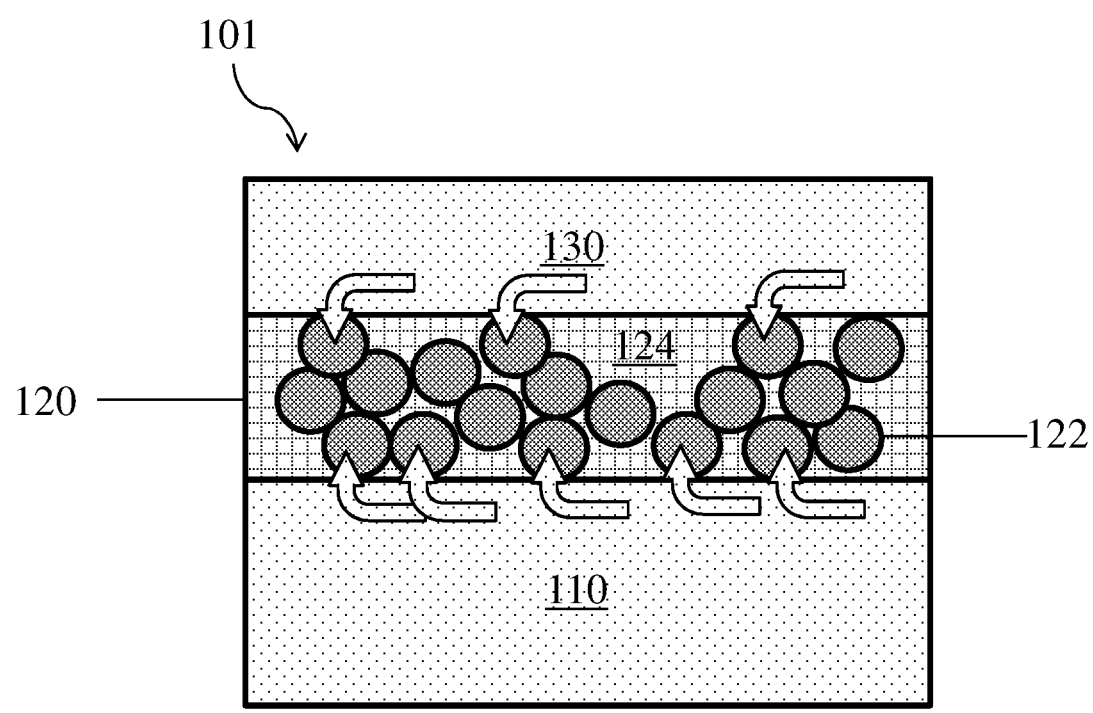

In some embodiments, a composite protective layer may be activated by lithium that originates from two electroactive layers. For example, a composite protective layer may be positioned between two electroactive layers, each of which may activate it. FIG. 7 shows one non-limiting example of a method in which composite protective layer 120 reacts with and/or intercalates lithium from both first electroactive layer 110 and second electroactive layer 130.

In some embodiments, a surface of an electroactive layer adjacent a composite protective layer may have undergone one or more chemical treatments prior to formation of the electroactive layer and/or prior to being positioned adjacent the electroactive layer. The chemical treatment(s) may reduce the rate at which the electroactive layer activates the composite protective layer in comparison to an electroactive layer that has not been treated. For example, a composite protective layer positioned between a first electroactive layer including a surface that has undergone a chemical treatment and a second electroactive layer that has not undergone a chemical treatment may be activated more rapidly by the second electroactive layer. Non-limiting examples of such treatment include exposure of a surface of an electroactive layer to one or more gases, such as $CO_2$, NO, and oxygen plasma. In some embodiments, chemical treatment comprises exposing the surface of an electroactive layer to a plasma comprising one or more such gases.

In some embodiments, a composite protective layer may be activated by lithium that originates from one or more particles comprising lithium. The particles comprising lithium may be deposited onto and/or into the composite protective layer (e.g., by sputtering). The particles comprising lithium may be metallic and/or ceramic particles that comprise lithium (e.g., lithium oxide particles, lithium oxysulfide particles).

Figure 8:
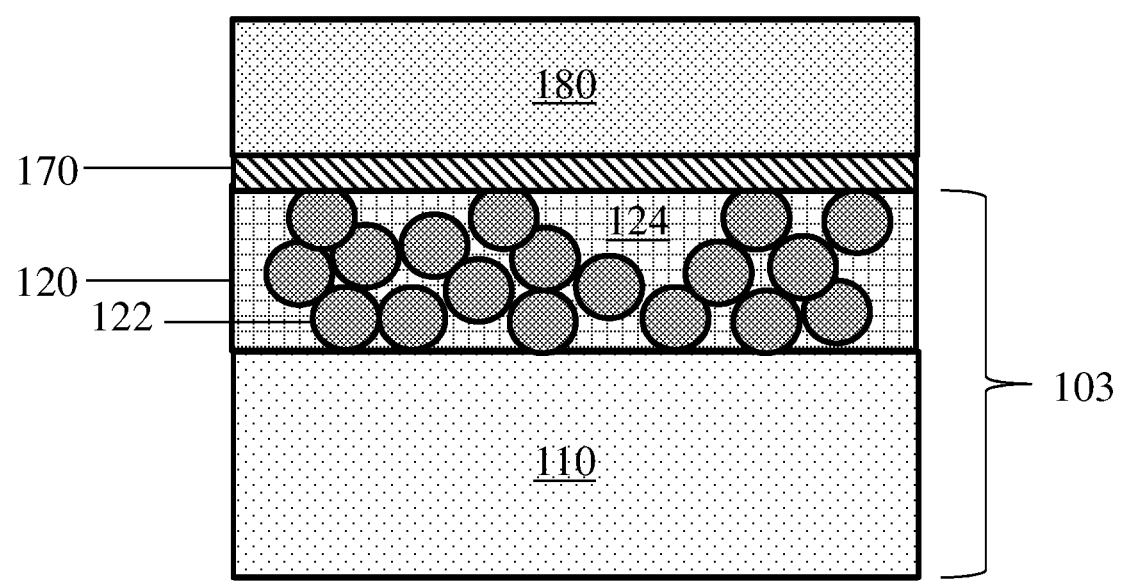
FIG. 8 shows an exemplary electrochemical cell comprising a stable SEI layer.

As described herein, certain embodiments relate to the formation of a stable SEI between a composite protective layer and an electrolyte. FIG. 8 shows one non-limiting embodiment of a stable SEI (layer) 170 positioned between electrode 103 and electrolyte 180. The SEI is an interface between the solid electrode and the electrolyte, and typically forms upon exposure of the electrode to the electrolyte. In some embodiments, the SEI layer may form between the composite protective layer and the electrolyte, as shown illustratively in FIG. 8. In other embodiments, the SEI layer may form at a different location, such as between the electroactive material or layer and the composite protective layer. In some embodiments, the SEI may include a portion of the composite protective layer. Certain embodiments may relate to exposing an electrode (e.g., an electrode comprising a composite protective layer) to an electrolyte, and/or to forming an SEI by exposing an electrode to an electrolyte.

A composite protective layer described herein may have any suitable properties. In some embodiments, a composite protective layer has a relatively high electronic conductivity. The electronic conductivity of the composite protective layer may be greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to $10^{0}$ S/cm, or greater than or equal to $10^{1}$ S/cm. The electronic conductivity of the composite protective layer may be less than or equal to $10^{2}$ S/cm, less than or equal to $10^{1}$ S/cm, less than or equal to $10^{0}$ S/cm, less than or equal to $10^{-1}$ S/cm, less than or equal to $10^{-2}$ S/cm, less than or equal to $10^{-3}$ S/cm, less than or equal to $10^{-4}$ S/cm, or less than or equal to $10^{-5}$ S/cm. Combinations of the above-referenced ranges are also possible (e.g., greater than or equal to $10^{-6}$ S/cm and less than or equal to $10^{2}$ S/cm). Other ranges are also possible. The electronic conductivity of the composite protective layer may be measured by EIS as described above.

When present, a composite protective layer typically has a relatively low area-specific impedance. The composite protective layer may have an area-specific impedance of less than or equal to 10,000 Ohms*cm$^2$, less than or equal to 1,000 Ohms*cm$^2$, less than or equal to 100 Ohms*cm$^2$, or less than or equal to 10 Ohms*cm$^2$. The composite protective layer may have an area-specific impedance of greater than or equal to 1 Ohms*cm$^2$, greater than or equal to 10 Ohms*cm$^2$, greater than or equal to 100 Ohms*cm$^2$, or greater than or equal to 1,000 Ohms*cm$^2$. Combinations of the above-referenced ranges are also possible (e.g., greater than or equal to 1 Ohms*cm$^2$ and less than or equal to 10,000 Ohms*cm$^2$). Other ranges are also possible. The area-specific impedance of the composite protective layer may be determined by EIS spectroscopy as described above.

When present, a composite protective layer may have any suitable thickness. In some embodiments, the thickness of the composite layer is greater than or equal to 2 microns, greater than or equal to 5 microns, greater than or equal to 10 microns, greater than or equal to 20 microns, greater than or equal to 50 microns, greater than or equal to 100 microns, or greater than or equal to 200 microns. In some embodiments, the thickness of the composite protective layer is less than or equal to 500 microns, less than or equal to 200 microns, less than or equal to 100 microns, less than or equal to 50 microns, less than or equal to 20 microns, less than or equal to 10 microns, or less than or equal to 5 microns. Combinations of the above-referenced ranges are also possible (e.g., greater than or equal to 2 microns and less than or equal to 500 microns). Other ranges are also possible The thickness of the composite layer may be determined by using scanning electron microscopy.

In some embodiments, an electrode may comprise a composite protective layer that is porous. In some embodiments, pores make up greater than or equal to 2 vol % of the composite protective layer, greater than or equal to 5 vol % of the composite protective layer, greater than or equal to 10 vol % of the composite protective layer, greater than or equal to 20 vol % of the composite protective layer, greater than or equal to 30 vol % of the composite protective layer, greater than or equal to 40 vol % of the composite protective layer, greater than or equal to 50 vol % of the composite protective layer, greater than or equal to 60 vol % of the composite protective layer, greater than or equal to 70 vol %, of the composite protective layer or greater than or equal to 80 vol % of the composite protective layer. In some embodiments, pores make up less than or equal to 90 vol % of the composite protective layer, less than or equal to 80 vol % of the composite protective layer, less than or equal to 70 vol % of the composite protective layer, less than or equal to 60 vol % of the composite protective layer, less than or equal to 50 vol % of the composite protective layer, less than or equal to 40 vol % of the composite protective layer, less than or equal to 30 vol % of the composite protective layer, or less than or equal to 20 vol % of the composite protective layer. Combinations of the above-referenced ranges are also possible (e.g., greater than or equal to 10 vol % and less than or equal to 90 vol %).

The porosity of the composite protective layer may be determined by measuring the volume enclosed by the outer boundary of the composite protective layer (e.g., by use of a ruler), measuring the pore volume of the composite protective layer by employing ASTM standard D4284-07 as described below, dividing the measured pore volume by the volume enclosed by the composite protective layer, and multiplying by 100%. ASTM standard D4284-07, incorporated herein by reference in its entirety, can be used to produce a distribution of pore sizes plotted as the cumulative intruded pore volume as a function of pore diameter. To calculate the porosity, one would calculate the area under the curve that spans the given range over the x-axis. Optionally, in cases where the article includes pore sizes that lie outside the range of pore sizes that can be accurately measured using ASTM standard D4284-07, porosimetry measurements may be supplemented using BET surface analysis, as described, for example, in S. Brunauer, P. H. Emmett, and E. Teller, J. Am. Chem. Soc., 1938, 60, 309, which is incorporated herein by reference in its entirety.

In some embodiments, a composite protective layer as described herein comprises pores and at least 50% of the pore volume, at least 60% of the pore volume, at least 70% of the pore volume, at least 80% of the pore volume, or at least 90% of the pore volume is made up of pores with a cross-sectional diameter of greater than or equal to 0.001 microns, greater than or equal to 0.002 microns, greater than or equal to 0.005 microns, greater than or equal to 0.01 microns, greater than or equal to 0.02 microns, greater than or equal to 0.05 microns, greater than or equal to 0.1 microns, or greater than or equal to 0.2 microns. In some cases, at least 50% of the pore volume, at least 75% of the pore volume, or at least 90% of the pore volume is made up of pores with a cross-sectional diameter of less than or equal to 0.5 microns, less than or equal to 0.2 microns, less than or equal to 0.1 microns, less than or equal to 0.05 microns, less than or equal to 0.02 microns, less than or equal to 0.01 microns, less than or equal to 0.005 microns, or less than or equal to 0.002 microns. Combinations of the above-referenced ranges are also possible (e.g., greater than or equal to 0.001 microns and less than or equal to 0.5 microns). Other ranges are also possible. As used herein, the "cross-sectional diameter" of a pore refers to a cross-sectional diameter as measured using ASTM Standard Test D4284-07. One of ordinary skill in the art would be capable of calculating the distribution of cross-sectional diameters and the average cross-sectional diameter of the pores within a layer using mercury intrusion porosimetry as described in ASTM standard D4284-07. To calculate the percentage of the total pore volume within the sample that is occupied by pores within a given range of pore diameters, one would: (1) calculate the area under the curve that spans the given range over the x-axis, (2) divide the area calculated in step (1) by the total area under the curve, and (3) multiply by 100%.

In embodiments in which a composite protective layer that comprises particles is provided, the particles may have any suitable composition. As described herein, the particles may be formed of a material that can be intercalate lithium and/or can react with lithium. In some embodiments, the particles comprise one or more of lithium transition metal oxides, titanium oxide, nanographite, boron, boron carbide, silicon carbide, rare earth metal carbides, transition metal carbides, boron nitride, silicon nitride, rare earth metal nitrides, and transition metal nitrides.

In some embodiments, a composite protective layer may comprise nanographite. As used herein, nanographite is a form of graphite that includes stacked graphene planes. Nanographite may be characterized by two dimensions: a thickness perpendicular to the graphene planes and a lateral particle size perpendicular to the thickness. The lateral particle size is determined by calculating the projected area of the nanographite perpendicular to its thickness and then finding the diameter of a circle enclosing the same area. In some embodiments, the nanographite has a lateral particle size of less than or equal to 500 nm, less than or equal to 300 nm, less than or equal to 200 nm, less than or equal to 100 nm, less than or equal to 50 nm, or less than or equal to 20 nm. In some embodiments, the nanographite has a lateral particle size of greater than or equal to 10 nm, greater than or equal to 20 nm, greater than or equal to 50 nm, greater than or equal to 100 nm, greater than or equal to 200 nm, or greater than or equal to 300 nm. Combinations of the above-referenced ranges are also possible (e.g., greater than or equal to 10 nm and less than or equal to 500 nm, or greater than or equal to 10 nm and less than or equal to 500 nm). Other ranges are also possible. In some embodiments, the composite protective layer may comprise two populations of nanographite, each with a different lateral particle size (e.g., a population of nanographite with a lateral particle size of less than or equal to 10 nm and a population of nanographite with a lateral particle size of greater than 10 nm and less than or equal to 500 nm).

In some embodiments, a composite protective layer may comprise nanographite with an average thickness of less than or equal to 500 nm, less than or equal to 200 nm, less than or equal to 100 nm, less than or equal to 50 nm, less than or equal to 40 nm, less than or equal to 30 nm, less than or equal to 20 nm, less than or equal to 10 nm, or less than or equal to 5 nm. In some embodiments, the nanoparticles have a thickness of greater than or equal to 2 nm, greater than or equal to 5 nm, greater than or equal to 10 nm, greater than or equal to 20 nm, greater than or equal to 30 nm, greater than or equal to 40 nm, greater than or equal to 50 nm, greater than or equal to 100 nm, or greater than or equal to 200 nm. Combinations of the above-referenced ranges are also possible (e.g., greater than or equal to 2 nm and less than or equal to 500 nm). Other ranges are also possible.

In some embodiments, a composite protective layer may comprise a relatively low amount of particles (e.g., nanographite particles) in comparison to the amount of electroactive material, and/or the particles (e.g., nanographite) may be overlithiated. It is unexpected that small amounts of particles such as nanographite would improve electrochemical cell properties, as traditionally it is believed that an excess of lithium can result in lithium plating on the particles such as nanographite. In some embodiments, a ratio of the weight of the particles (e.g., nanographite) in the composite protective layer to the weight of the electroactive material in the composite protective layer may be less than or equal to 49, less than or equal to 19, less than or equal to 15, less than or equal to 12.5, less than or equal to 10, less than or equal to 9, less than or equal to 7.5, less than or equal to 5, less than or equal to 2.5, less than or equal to 1, less than or equal to 0.75, less than or equal to 0.5, less than or equal to 0.42, less than or equal to 0.25, less than or equal to 0.1, or less than or equal to 0.05. In some embodiments, the ratio of the weight of the particles in the composite protective layer to the weight of the electroactive material in the composite protective layer may be greater than or equal to 0.02, greater than or equal to 0.05, greater than or equal to 0.1, greater than or equal to 0.25, greater than or equal to 0.42, greater than or equal to 0.5, greater than or equal to 0.75, greater than or equal to 1, greater than or equal to 2.5, greater than or equal to 5, greater than or equal to 7.5, greater than or equal to 9, greater than or equal to 10, greater than or equal to 12.5, greater than or equal to 15, or greater than or equal to 19. Combinations of the above-referenced ranges are also possible (e.g., greater than or equal to 0.02 and less than or equal to 49, greater than or equal to 0.1 and less than or equal to 19, or greater than or equal to 0.42 and less than or equal to 9). Other ranges are also possible. These ratios may be determined by weighing non-electroactive material components of the composite protective layer, including the particles that will be positioned the composite protective layer, before forming the composite protective layer; forming the composite protective layer; and then weighing the composite protective layer. The weight of the electroactive material could be determined by subtracting out the measured weights of the other composite protective layer components. Then, the ratio of the particles to the electroactive material in the composite protective layer could be determined by dividing the measured weight of the particles by the calculated weight of the electroactive material.

In some embodiments, a ratio of the weight of nanographite in the electrode to the weight of electroactive material in the electrode may be less than or equal to 49, less than or equal to 19, less than or equal to 15, less than or equal to 12.5, less than or equal to 10, less than or equal to 9, less than or equal to 7.5, less than or equal to 5, less than or equal to 2.5, less than or equal to 1, less than or equal to 0.75, less than or equal to 0.5, less than or equal to 0.42, less than or equal to 0.25, less than or equal to 0.1, or less than or equal to 0.05. In some embodiments, the ratio of the weight of the nanographite in the electrode to the weight of the electroactive material in the electrode may be greater than or equal to 0.02, greater than or equal to 0.05, 0.1, greater than or equal to 0.25, greater than or equal to 0.42, greater than or equal to 0.5, greater than or equal to 0.75, greater than or equal to 1, greater than or equal to 2.5, greater than or equal to 5, greater than or equal to 7.5, greater than or equal to 9, greater than or equal to 10, greater than or equal to 12.5, greater than or equal to 15, or greater than or equal to 19. Combinations of the above-referenced ranges are also possible (e.g., greater than or equal to 0.02 and less than or equal to 49, greater than or equal to 0.1 and less than or equal to 19, or greater than or equal to 0.42 and less than or equal to 9). Other ranges are also possible. This ratio could be determined by weighing non-electroactive material components of the electrode, including the nanographite, before forming the composite protective layer; forming the electrode; and then weighing the electrode. The weight of the electroactive material could be determined by subtracting out the measured weights of the other electrode components. Then, the ratio of the nanographite to the electroactive material in the electrode could be determined by dividing the measured weight of the nanographite by the calculated weight of the electroactive material.

When present, particles in a composite protective layer may have any suitable average diameter. In some embodiments, the particles in the composite protective layer may have an average diameter of greater than or equal to 10 nanometers, greater than or equal to 15 nanometers, greater than or equal to 20 nanometers, greater than or equal to 50 nanometers, greater than or equal to 100 nanometers, greater than or equal to 200 nanometers, greater than or equal to 500 nanometers, greater than or equal to 1 micron, greater than or equal to 2 microns, or greater than or equal to 5 microns. In some embodiments, the particles in the composite protective layer may have an average diameter of less than or equal to 10 microns, less than or equal to 5 microns, less than or equal to 2 microns, less than or equal to 1 micron, less than or equal to 500 nanometers, less than or equal to 200 nanometers, less than or equal to 100 nanometers, less than or equal to 50 nanometers, less than or equal to 20 nanometers, or less than or equal to 15 nanometers. Combinations of the above-referenced ranges are also possible (e.g., greater than or equal to 10 nanometers and less than or equal to 10 microns). Other ranges are also possible. The average diameter of particles in a composite protective layer may be determined by imaging the particles with a scanning electron microscope (SEM). An image may be acquired at a magnification between about 10× to about 100,000×, depending on the overall dimensions of the plurality of particles. Those skilled in the art would be capable of selecting an appropriate magnification for imaging the sample. The diameter of an individual particle can be determined by calculating the volume of each particle, calculating the radius of a sphere that would enclose an equivalent volume, and calculating the radius of that sphere. The average diameter of the particles may be determined by taking the average of the individual particle diameters.

When present, particles in a composite protective layer may have any suitable lithium ion conductivity. As described above, particles that comprise lithium may have a higher lithium ion conductivity than particles that do not comprise lithium or particles that comprise lithium to a lesser extent.

In some embodiments, the particles in the composite protective layer may include lithium in a relatively low amount (e.g., prior to activation) and the lithium ion conductivity of the particles in the composite protective layer may be than or equal to $10^{-7}$ S/cm, less than or equal to $10^{-8}$ S/cm, or less than or equal to $10^{-9}$ S/cm. In some embodiments, the lithium ion conductivity of the particles in the composite protective layer may be greater than or equal to $10^{-10}$ S/cm, greater than or equal to $10^{-9}$ S/cm, or greater than or equal to $10^{-8}$ S/cm. Combinations of the above-referenced ranges are also possible (e.g., greater than or equal to $10^{-10}$ S/cm and less than or equal to $10^{-7}$ S/cm). Other ranges are also possible. In some embodiments, an electrochemical cell may comprise a composite protective layer comprising particles which, prior to the particles' incorporation into the composite protective layer (e.g., prior to activation with lithium), have a lithium ion conductivity in one or more of the above-reference ranges.

In some embodiments, the particles in the composite protective layer may include lithium in at least a moderate amount and the lithium ion conductivity of the particles in the composite protective layer may be greater than or equal to $10^{-5}$ S/cm, greater than or equal to $10^{-4}$ S/cm, greater than or equal to $10^{-3}$ S/cm, greater than or equal to $10^{-2}$ S/cm, or greater than or equal to $10^{-1}$ S/cm. In some embodiments, the lithium ion conductivity of the particles in the composite layer may be less than or equal to $10^{0}$ S/cm, less than or equal to $10^{-1}$ S/cm, less than or equal to $10^{-2}$ S/cm, less than or equal to $10^{-3}$ S/cm, or less than or equal to $10^{-4}$ S/cm. Combinations of the above-referenced ranges are also possible (e.g., greater than or equal to $10^{-5}$ S/cm and less than or equal to $10^{0}$ S/cm). Other ranges are also possible. In some embodiments, an electrochemical cell may comprise a composite protective layer comprising particles which, prior to the particles' incorporation into the composite protective layer (e.g., prior to activation with lithium), have a lithium ion conductivity in one or more of the above-reference ranges.

The lithium ion conductivity of the particles can be determined before the particles are incorporated into the composite layer, e.g., by pressing the particles between two copper cylinders at a pressure of up to 3 tons/cm² and then employing EIS spectroscopy as described above.

When present, particles in a composite protective layer may have a relatively high electronic conductivity. In some embodiments, the electronic conductivity of the particles in the protective layer may be greater than or equal to $10^{-6}$ S/cm, greater than or equal to $10^{-5}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to $10^{0}$ S/cm, or greater than or equal to $10^{1}$ S/cm. In some embodiments, the electronic conductivity of the particles in the composite protective layer may be less than or equal to $10^{2}$ S/cm, less than or equal to $10^{1}$ S/cm, less than or equal to $10^{0}$ S/cm, less than or equal to $10^{-1}$ S/cm, less than or equal to $10^{-2}$ S/cm, less than or equal to $10^{-3}$ S/cm, less than or equal to $10^{-4}$ S/cm, or less than or equal to $10^{-5}$ S/cm. Combinations of the above-referenced ranges are also possible (e.g., greater than or equal to $10^{-6}$ S/cm and less than or equal to $10^{2}$ S/cm). Other ranges are also possible. In some embodiments, an electrochemical cell may comprise a composite protective layer comprising particles which, prior to the particles' assembly into the composite protective layer (e.g., prior to activation with lithium), have an electronic conductivity in one or more of the above-reference ranges. The electronic conductivity of the particles in the protective layer may be determined before the particles are incorporated into the composite layer, e.g., by pressing the particles between two copper cylinders at a pressure of up to 3 tons/cm² and then employing EIS spectroscopy as described above.

When present, the particles described herein (e.g., particles that can be activated) may make up any suitable wt % of the composite protective layer. In some embodiments, the particles may make up greater than or equal to 50 wt % of the composite protective layer, greater than or equal to 55 wt % of the composite protective layer, greater than or equal to 60 wt % of the composite protective layer, greater than or equal to 65 wt % of the composite protective layer, greater than or equal to 70 wt % of the composite protective layer, greater than or equal to 75 wt % of the composite protective layer, greater than or equal to 80 wt % of the composite protective layer, greater than or equal to 85 wt % of the composite protective layer, greater than or equal to 90 wt % of the composite protective layer, greater than or equal to 95 wt % of the composite protective layer, or greater than or equal to 97 wt % of the composite protective layer. In some embodiments, the particles may make up less than or equal to 99 wt % of the composite protective layer, less than or equal to 97 wt % of the composite protective layer, less than or equal to 95 wt % of the composite protective layer, less than or equal to 90 wt % of the composite protective layer, less than or equal to 85 wt % of the composite protective layer, less than or equal to 80 wt % of the composite protective layer, less than or equal to 75 wt % of the composite protective layer, less than or equal to 70 wt % of the composite protective layer, less than or equal to 65 wt % of the composite protective layer, less than or equal to 60 wt % of the composite protective layer, or less than or equal to 55 wt % of the composite protective layer. Combinations of the above-referenced ranges are also possible (e.g., greater than or equal to 50 wt % of the composite protective layer and less than or equal to 99 wt % of the composite protective layer, or greater than or equal to 70 wt % of the composite protective layer and less than or equal to 95 wt %). Other ranges are also possible.

As described above, certain embodiments relate to composite protective layers that comprise a polymeric binder. The polymeric binder may aid in binding the particles together and/or binding the composite protective layer to the underlying layer on which the composite protective layer is positioned. In some embodiments, the particles may be dispersed in the polymeric binder, or the binder may serve as a matrix in which one or more particles are disposed. In some embodiments, at least a portion of the particles present in the composite protective layer may be encapsulated by the polymeric binder. As an example, greater than or equal to 50%, greater than or equal to 75%, greater than or equal to 90%, greater than or equal to 95%, or greater than or equal to 99% of the surface area of at least a portion of the particles may be in direct contact with the polymeric binder. The polymeric binder may be distributed fairly evenly throughout the layer. For instance, the density of the polymeric binder in the layer may vary by less than or equal to 30%, less than or equal to 20%, less than or equal to 10%, less than or equal to 5%, less than or equal to 2%, or less than or equal to 1% across the volume of the layer.

In some embodiments, a polymeric binder may have one or more beneficial properties, such as increasing the protective properties of a composite protective layer of which it is a part. For example, the polymeric binder may be relatively insoluble in common electrolytes, and/or may swell to a relatively low degree in common electrolytes such as aprotic electrolytes. The extent of the solubility and/or swelling of the polymeric binder in an electrolyte may be determined by weighing the polymeric binder, exposing the polymeric binder to the electrolyte for 24 hours, air drying the polymeric binder at room temperature under a fume hood in a dry room, evaluating whether or not the polymeric binder breaks apart, and then weighing the polymeric binder again. If the polymeric binder breaks apart, it cannot be weighed accurately and is considered to swell to at least a moderate degree in the electrolyte and/or is considered at least partially soluble or soluble in the electrolyte. If the polymeric binder increases in weight by less than 20%, it is considered to swell to a relatively low degree in the electrolyte. If the polymeric binder increases in weight by less than 2%, it is considered to be relatively insoluble in the electrolyte. In some embodiments, the polymeric binder increases in weight by less than or equal to 25%, less than or equal to 20%, less than or equal to 15%, less than or equal to 10%, less than or equal to 5%, less than or equal to 2%, or less than or equal to 1%. In some embodiments, the polymeric binder increases in weight by greater than or equal to 0%, greater than or equal to 1%, greater than or equal to 2%, greater than or equal to 5%, greater than or equal to 10%, greater than or equal to 15%, or greater than or equal to 20%. Combinations of the above-referenced ranges are also possible (e.g., greater than or equal to 0% and less than or equal to 25%, greater than or equal to 0% and less than or equal to 20%, or greater than or equal to 0% and less than or equal to 10%). Other ranges are also possible.

The polymeric binder may have any suitable composition. In some embodiments, the polymeric binder may comprise one or more of an elastomer, a thermoset, or a thermoplastic. In some embodiments, the polymeric binder is a polyol (e.g., poly(vinyl alcohol)), a fluorinated polymer (e.g., poly(vinylidene fluoride)), a latex rubber, an EPDM rubber, an acrylic, a silane, a siloxane (e.g., PDMS), a polydiene, an epoxy, a polyurethane, a polyacrylamide, a thiol-ene polymer, poly(vinyl pyrrolidone), poly(isopropylene), poly(ethylene imine), poly(acrylonitride), poly(ethylene oxide), a block copolymer, a styrene-butadiene rubber, Kraton 1924FG, or combinations thereof.

When present, a polymeric binder may make up any suitable wt % of the composite protective layer. In some embodiments, the polymeric binder makes up greater than or equal to 1 wt % of the composite protective layer, greater than or equal to 2 wt % of the composite protective layer, greater than or equal to 5 wt % of the composite protective layer, greater than or equal to 10 wt % of the composite protective layer, greater than or equal to 15 wt % of the composite protective layer, greater than or equal to 20 wt % of the composite protective layer, greater than or equal to 25 wt % of the composite protective layer, greater than or equal to 30 wt % of the composite protective layer, greater than or equal to 35 wt % of the composite protective layer, greater than or equal to 40 wt % of the composite protective layer, or greater than or equal to 45 wt % of the composite protective layer. In some embodiments, the polymeric binder makes up less than or equal to 50 wt % of the composite protective layer, less than or equal to 45 wt % of the composite protective layer, less than or equal to 40 wt % of the composite protective layer, less than or equal to 35 wt % of the composite protective layer, less than or equal to 30 wt % of the composite protective layer, less than or equal to 25 wt % of the composite protective layer, less than or equal to 20 wt % of the composite protective layer, less than or equal to 15 wt % of the composite protective layer, less than or equal to 10 wt % of the composite protective layer, less than or equal to 5 wt % of the composite protective layer, or less than or equal to 2 wt % of the composite protective layer. Combinations of the above-referenced ranges are also possible (e.g., greater than or equal to 1 wt % of the composite protective layer and less than or equal to 50 wt % of the composite protective layer, or greater than or equal to 5 wt % and less than or equal to 30 wt % of the composite protective layer). Other ranges are also possible.

In some embodiments, a composite protective layer may comprise a polymeric binder with a relatively low lithium ion conductivity. The lithium ion conductivity of the polymeric binder may be less than or equal to $1*10^{-6}$ S/cm, $5*10^{-7}$ S/cm, $1*10^{-7}$ S/cm, or $5*10^{-8}$ S/cm. The lithium ion conductivity of the polymeric binder may be greater than or equal to $1*10^{-8}$ S/cm, $5*10^{-8}$ S/cm, $1*10^{-7}$ S/cm, or $5*10^{-7}$ S/cm. Combinations of the above-referenced ranges are also possible (e.g., less than or equal to $10^{-6}$ S/cm and greater than $10^{-8}$ S/cm). Other ranges are also possible. The lithium ion conductivity of the polymeric binder may be determined by EIS as described above.

In some embodiments, a composite protective layer may comprise a polymeric binder with a relatively low electronic conductivity. The electronic conductivity of the polymeric binder may be less than or equal to $1*10^{-6}$ S/cm, $5*10^{-7}$ S/cm, $1*10^{-7}$ S/cm, or $5*10^{-8}$ S/cm. The electronic conductivity of the polymeric binder may be greater than or equal to $1*10^{-8}$ S/cm, $5*10^{-8}$ S/cm, $1*10^{-7}$ S/cm, or $5*10^{-7}$ S/cm.

Combinations of the above-referenced ranges are also possible (e.g., less than or equal to $10^{-6}$ S/cm and greater than $10^{-8}$ S/cm). Other ranges are also possible. The electronic conductivity of the polymeric binder may be determined by EIS as described above.

In some embodiments, a composite protective layer may further comprise one or more additives. Non-limiting examples of suitable additives may include thickening agents, plasticizers, thixotropic agents, wetting agents, demulsifiers, catalysts, monomers, initiators, silica, boehmite, and alumina.

When present, the additive(s) may make up greater than or equal to 0.5 wt % of a composite protective layer, greater than or equal to 1 wt % of the composite protective layer, greater than or equal to 2 wt % of the composite protective layer, greater than or equal to 5 wt % of the composite protective layer, or greater than or equal to 10 wt % of the composite protective layer. In some embodiments, the additive(s) make up less than or equal to 20 wt % of the composite protective layer, less than or equal to 10 wt % of the composite protective layer, less than or equal to 5 wt % of the composite protective layer, less than or equal to 2 wt % of the composite protective layer, or less than or equal to 1 wt % of the composite protective layer. Combinations of the above-referenced ranges are also possible (e.g., greater than or equal to 2 wt % and less than or equal to 5 wt % of the composite protective layer, or greater than or equal to 5 wt % and less than or equal to 10 wt % of the composite protective layer). Other ranges are also possible.

As described above, certain embodiments relate to electrodes that comprise an electroactive material and/or an electroactive material layer. Suitable electroactive materials and/or electroactive materials present in an electroactive layer (e.g., a first electroactive layer, a second electroactive layer) include, but are not limited to, lithium metal such as lithium foil and lithium deposited onto a substrate, and lithium alloys (e.g., lithium-aluminum alloys and lithium-tin alloys). Suitable lithium alloys for use in the embodiments described herein can include alloys of lithium and aluminum, magnesium, silicium (silicon), indium, silver, and/or tin. While these materials may be preferred in some embodiments, other cell chemistries are also contemplated. In some embodiments, the anode first electrode may comprise one or more binder materials (e.g., polymers, etc.). The electroactive materials described above may be suitable for use as an anode active electrode species when an electrode is an anode.

In some embodiments, the thickness of the first electroactive layer may vary from, e.g., 1 to 200 microns. For instance, the first electroactive layer may have a thickness of less than or equal to 200 microns, less than or equal to 100 microns, less than or equal to 50 microns, less than or equal to 25 microns, less than or equal to 10 microns, or less than or equal to 5 microns. In certain embodiments, the first electroactive layer may have a thickness of greater than or equal to 1 micron, greater than or equal to 5 microns, greater than or equal to 10 microns, greater than or equal to 25 microns, greater than or equal to 50 microns, greater than or equal to 100 microns, or greater than or equal to 150 microns. Combinations of the above-referenced ranges are also possible (e.g., greater than or equal to 1 micron and less than or equal to 200 microns, greater than or equal to 1 micron and less than or equal to 100 microns, greater than or equal to 5 microns and less than or equal to 50 microns, greater than or equal to 5 microns and less than or equal to 25 microns, greater than or equal to 10 microns and less than or equal to 25 microns). Other ranges are also possible. The choice of the thickness may depend on cell design parameters such as the excess amount of lithium desired, cycle life, and the thickness of other electrode(s) in an electrochemical cell in which the electrode is positioned.

When present, the second electroactive layer may have a thickness that is less than the thickness of the first electroactive layer. For instance, the thickness of the second electroactive layer may be less than or equal to 50% of the thickness of the first electroactive layer, less than or equal to 40% of the thickness of the first electroactive layer, less than or equal to 33% of the thickness of the first electroactive layer, less than or equal to 10% of the thickness of the first electroactive layer, less than or equal to 5% of the thickness of the first electroactive layer, less than or equal to 2% of the thickness of the first electroactive layer, or less than or equal to 1% of the thickness of the first electroactive layer. In some embodiments, the thickness of the second electroactive layer may be greater than or equal to 0.5% of the thickness of the first electroactive layer, greater than or equal to 1% of the thickness of the first electroactive layer, greater than or equal to 2% of the thickness of the first electroactive layer, greater than or equal to 5% of the thickness of the first electroactive layer, greater than or equal to 10% of the thickness of the first electroactive layer, greater than or equal to 33% of the thickness of the first electroactive layer, or greater than or equal to 40% of the thickness of the first electroactive layer. Combinations of the above-referenced ranges are also possible (e.g., greater than or equal to 1% of the thickness of the first electroactive layer and less than or equal to 50% of the thickness of the first electroactive layer, greater than or equal to 1% of the thickness of the first electroactive layer and less than or equal to 33% of the thickness of the first electroactive layer, or greater than or equal to 1% of the thickness of the first electroactive layer and less than or equal to 10% of the thickness of the first electroactive layer). Other ranges are also possible.

In embodiments comprising a second electroactive layer, the thickness of the second electroactive layer may be less than or equal to 20 microns, less than or equal to 10 microns, less than or equal to 5 microns, less than or equal to 2 microns, less than or equal to 1 micron, less than or equal to 500 nanometers, less than or equal to 200 nanometers, or less than or equal to 100 nanometers. In some embodiments, the thickness of the second electroactive layer may be greater than or equal to 50 nanometers, greater than or equal to 100 nanometers, greater than or equal to 200 nanometers, greater than or equal to 500 nanometers, greater than or equal to 1 micron, greater than or equal to 2 microns, greater than or equal to 5 microns, or greater than or equal to 10 microns. Combinations of the above-referenced ranges are also possible (e.g., greater than or equal to 50 nanometers and less than or equal to 20 microns). Other ranges are also possible.

As described above, in certain embodiments a composite protective layer may be disposed on or deposited onto a support layer. A support layer may be a layer that supports the composite protective layer, and/or may be a layer onto which it is beneficial to deposit the composite protective layer. For example, in one set of embodiments, the support layer may be disposed on a layer such as a carrier substrate that is not designed to be incorporated into a final electrochemical cell and may be capable of releasing the composite protective layer from that layer. When the support layer is adjacent a carrier substrate, the support layer may be partially or entirely delaminated from the electroactive material or layer during subsequent steps in electrochemical cell formation, and/or it may be partially or entirely delaminated from the carrier substrate during subsequent steps in electrochemical cell formation.

As another example, the support layer may be disposed on a layer which may be incorporated into an electrochemical cell but onto which it may be challenging to deposit a composite protective layer, such as a separator or an additional support layer (e.g., an additional support layer on a separator). A support layer that is adjacent a separator may serve to prevent deposition of one or more portions of a composite protective layer (e.g., particles, polymeric binder) into any pores present in the separator and/or may serve to prevent contact between the separator and the composite protective layers. In some embodiments, a support layer that is initially adjacent a carrier substrate or a separator may be incorporated into a final electrochemical cell.

In some such cases, such as when a support layer is incorporated into a final electrochemical cell, the support layer may be formed of a material that is stable in the electrolyte and does not substantially interfere with the structural integrity of the electrode. For example, the support layer may be formed of a polymer or gel electrolyte (e.g., it may comprise lithium ions and/or be conductive to lithium ions) and/or a polymer that may swell in a liquid electrolyte to form a polymer gel electrolyte. In certain embodiments, the support layer itself may function as a separator. In some embodiments, a support layer may be formed of a polymer that is soluble in an electrolyte present in an electrochemical cell in which the electrode comprising the composite protective layer is positioned (e.g., an aprotic electrolyte), and/or may be dissolved upon exposure to the electrolyte (e.g., upon exposure to the aprotic electrolyte).

In some embodiments, the support layer may be a release layer, such as the release layers described in U.S. Pat. Pub. No. 2014/272,565, U.S. Pat. Pub. No. 2014/272,597, and U.S. Pat. Pub. No. 2011/068,001, each of which are herein incorporated by reference in their entirety.

In one set of embodiments, a support layer (e.g., a polymeric support layer, a release layer) is formed of a polymeric material. Specific examples of appropriate polymers include, but are not limited to, polyoxides, poly(alkyl oxides)/polyalkylene oxides (e.g., polyethylene oxide, polypropylene oxide, polybutylene oxide), polyvinyl alcohols, polyvinyl butyral, polyvinyl formal, vinyl acetate-vinyl alcohol copolymers, ethylene-vinyl alcohol copolymers, and vinyl alcohol-methyl methacrylate copolymers, polysiloxanes, and fluorinated polymers. The polymer may be in the form of, for example, a solid polymer (e.g., a solid polymer electrolyte), a glassy-state polymer, or a polymer gel.

Additional examples of polymeric materials include polysulfones, polyethersulfone, polyphenylsulfones (e.g., Ultrason® S 6010, S 3010 and S 2010, available from BASF), polyethersulfone-polyalkyleneoxide copolymers, polyphenylsulfone-polyalkyleneoxide copolymers, polysulfone-polyalkylene oxide copolymers, polyisobutylene (e.g., Oppanol® B10, B15, B30, B80, B150 and B200, available from BASF), polyisobutylene succinic anhydride (PIBSA), polyisobutylene-polyalkyleneoxide copolymers, polyamide 6 (e.g., Ultramid® B33, available from BASF) (e.g., extrusion of 2 μm polyamide layer on polyolefin carrier or solution casting of PA layer on polyolefin carrier substrate), polyvinylpyrrolidone, polyvinylpyrrolidone-polyvinylimidazole copolymers (e.g., Sokalan® HP56, available from BASF), polyvinylpyrrolidone-polyvinylactetate copolymers (e.g., Luviskol®, available from BASF), maleinimide-vinylether copolymers, polyacrylamides, fluorinated polyacrylates (optionally including surface reactive comonomers), polyethylene-polyvinylalcohol copolymers (e.g., Kuraray®, available from BASF), polyethylene-polyvinylacetate copolymers, polyvinylalcohol and polyvinylacetate copolymers, polyoxymethylene (e.g., extruded), polyvinylbutyral (e.g., Kuraray®, available from BASF), polyureas (e.g., branched), polymers based on photopolymerization of acrolein derivatives (CH2=CR—C(O)R), polysulfone-polyalkyleneoxide copolymers, polyvinylidene difluoride (e.g., Kynar® D155, available from BASF), and combinations thereof.

In one embodiment, a support layer comprises a polyethersulfone-polyalkylene oxide copolymer. In one particular embodiment, the polyethersulfone-polyalkylene oxide copolymer is a polyarylethersulfone-polyalkylene oxide copolymer (PPC) obtained by polycondensation of reaction mixture (RG) comprising the components: (A1) at least one aromatic dihalogen compound, (B1) at least one aromatic dihydroxyl compound, and (B2) at least one polyalkylene oxide having at least two hydroxyl groups. The reaction mixture may also include (C) at least one aprotic polar solvent and (D) at least one metal carbonate, where the reaction mixture (RG) does not comprise any substance which forms an azeotrope with water. The resulting copolymer may be a random copolymer or a block copolymer. For instance, the resulting copolymer may include blocks of A1-B1, and blocks of A1-B2. The resulting copolymer may, in some instances, include blocks of A1-B1-A1-B2.

Further examples of polymeric materials include polyimide (e.g., Kapton®) with a hexafluoropropylene (HFP) coating (e.g., available from Dupont); siliconized polyester films (e.g., a Mitsubishi polyester), metallized polyester films (e.g., available from Mitsubishi or Sion Power), polybenzimidazoles (PBI; e.g., low molecular weight PBI—available from Celanese), polybenzoxazoles (e.g., available from Foster-Miller, Toyobo), ethylene-acrylic acid copolymers (e.g., Poligen®, available from BASF), acrylate based polymers (e.g., Acronal®, available from BASF), (charged) polyvinylpyrrolidone-polyvinylimidazole copolymers (e.g., Sokalane® HP56, Luviquat®, available from BASF), polyacrylonitriles (PAN), styrene-acrylonitriles (SAN), thermoplastic polyurethanes (e.g., Elastollan® 1195 A 10, available from BASF), polysulfone-poly(akylene oxide) copolymers, benzophenone-modified polysulfone (PSU) polymers, polyvinylpyrrolidone-polyvinylactetate copolymers (e.g., Luviskol®, available from BASF), and combinations thereof.

In some embodiments, a support layer includes a polymer that is conductive to certain ions (e.g., alkali metal ions) but is also substantially electrically conductive. Examples of such materials include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(paraphenylene vinylene)s. Electrically-conductive additives may also be added to polymers to form electrically-conductive polymers.

In some embodiments, a support layer includes a polymer that is conductive to one or more types of ions. In some cases, the support layer may be substantially non-electrically conductive. Examples of ion-conductive species (that may be substantially non-electrically conductive) include non-electrically conductive materials (e.g., electrically insulating materials) that are doped with lithium salts. E.g., acrylate, polyethyleneoxide, silicones, polyvinylchlorides, and other insulating polymers that are doped with lithium salts can be ion-conductive (but substantially non-electrically conductive). Additional examples of polymers include ionically conductive polymers, sulfonated polymers, and hydrocarbon polymers. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylene-propylene polymers, polystyrene polymers, and the like.

In some embodiments, a support layer includes a crosslinkable polymer. Non-limiting examples of crosslinkable polymers include: polyvinyl alcohol, polyvinylbutyral, polyvinylpyridyl, polyvinyl pyrrolidone, polyvinyl acetate, acrylonitrile butadiene styrene (ABS), ethylene-propylene rubbers (EPDM), EPR, chlorinated polyethylene (CPE), ethylenebisacrylamide (EBA), acrylates (e.g., alkyl acrylates, glycol acrylates, polyglycol acrylates, ethylene ethyl acrylate (EEA)), hydrogenated nitrile butadiene rubber (HNBR), natural rubber, nitrile butadiene rubber (NBR), certain fluoropolymers, silicone rubber, polyisoprene, ethylene vinyl acetate (EVA), chlorosulfonyl rubber, fluorinated poly(arylene ether) (FPAE), polyether ketones, polysulfones, polyether imides, diepoxides, diisocyanates, diisothiocyanates, formaldehyde resins, amino resins, polyurethanes, unsaturated polyethers, polyglycol vinyl ethers, polyglycol divinyl ethers, copolymers thereof, and those described in U.S. Pat. No. 6,183,901 to Ying et al. of the common assignee for protective coating layers for separator layers.

Additional examples of crosslinkable or crosslinked polymers include UV/E-beam crosslinked Ultrason® or similar polymers (i.e., polymers comprising an amorphous blend of one or more of poly(sulfone), poly(ethersulfone), and poly (phenylsulfone)), UV crosslinked Ultrason®-polyalkyleneoxide copolymers, UV/E-beam crosslinked Ultrason®-acrylamide blends, crosslinked polyisobutylene-polyalkyleneoxide copolymers, crosslinked branched polyimides (BPI), crosslinked maleinimide-Jeffamine polymers (MSI gels), crosslinked acrylamides, and combinations thereof.

Those of ordinary skill in the art can choose appropriate polymers that can be crosslinked, as well as suitable methods of crosslinking, based upon general knowledge of the art in combination with the description herein. Crosslinked polymer materials may further comprise salts, for example, lithium salts, to enhance lithium ion conductivity.

If a crosslinkable polymer is used, the polymer (or polymer precursor) may include one or more crosslinking agents. A crosslinking agent is a molecule with a reactive portion(s) designed to interact with functional groups on the polymer chains in a manner that will form a crosslinking bond between one or more polymer chains. Examples of crosslinking agents that can crosslink polymeric materials used for support layers described herein include, but are not limited to: polyamide-epichlorohydrin (polycup 172); aldehydes (e.g., formaldehyde and urea-formaldehyde); dialdehydes (e.g., glyoxal glutaraldehyde, and hydroxyadipaldehyde); acrylates (e.g., ethylene glycol diacrylate, di(ethylene glycol) diacrylate, tetra(ethylene glycol) diacrylate, methacrylates, ethylene glycol dimethacrylate, di(ethylene glycol) dimethacrylate, tri(ethylene glycol) dimethacrylate); amides (e.g., N,N'-methylenebisacrylamide, N,N'-ethylenebisacrylamide, N,N'-(1,2-dihydroxyethylene)bisacrylamide, N-(1-hydroxy-2,2-dimethoxyethyl)acrylamide); silanes (e.g., methyltrimethoxysilane, methyltriethoxysilane, tetramethoxysilane (TMOS), tetraethoxysilane (TEOS), tetrapropoxysilane, methyltris(methylethyldetoxime)silane, methyltris(acetoxime)silane, methyltris(methylisobutylketoxime)silane, dimethyldi(methylethyldetoxime)silane, trimethyl(methylethylketoxime)silane, vinyltris(methylethylketoxime)silane, methylvinyldi(mtheylethylketoxime)silane, methylvinyldi(cyclohexaneoneoxxime)silane, vinyltris (mtehylisobutylketoxime)silane, methyltriacetoxysilane, tetraacetoxysilane, and phenyltris(methylethylketoxime)silane); divinylbenzene; melamine; zirconium ammonium carbonate; dicyclohexylcarbodiimide/dimethylaminopyridine (DCC/DMAP); 2-chloropyridinium ion; 1-hydroxycyclohexylphenyl ketone; acetophenon dimethylketal; benzoylmethyl ether; aryl triflourovinyl ethers; benzocyclobutenes; phenolic resins (e.g., condensates of phenol with formaldehyde and lower alcohols, such as methanol, ethanol, butanol, and isobutanol), epoxides; melamine resins (e.g., condensates of melamine with formaldehyde and lower alcohols, such as methanol, ethanol, butanol, and isobutanol); polyisocyanates; dialdehydes; and other crosslinking agents known to those of ordinary skill in the art.

Other classes of polymers that may be suitable for use in a support layer may include, but are not limited to, polyamines (e.g., poly(ethylene imine) and polypropylene imine (PPI)); polyamides (e.g., poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly (butylcyanoacrylate), poly(isobutylcyanoacrylate), poly(vinyl acetate), poly (vinyl alcohol), poly(vinyl chloride), poly (vinyl fluoride), poly(2-vinyl pyridine), polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly (propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride), poly (vinylidene difluoride, poly(vinylidene difluoride block copolymers); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

In some embodiments, the molecular weight of a polymer may be chosen to achieve a particular adhesive affinity and can vary in a support layer. In some embodiments, the molecular weight of a polymer used in a support layer may be greater than or equal to 1,000 g/mol, greater than or equal to 5,000 g/mol, greater than or equal to 10,000 g/mol, greater than or equal to 15,000 g/mol, greater than or equal to 20,000 g/mol, greater than or equal to 25,000 g/mol, greater than or equal to 30,000 g/mol, greater than or equal to 50,000 g/mol, greater than or equal to 100,000 g/mol or greater than or equal to 150,000 g/mol. In certain embodiments, the molecular weight of a polymer used in a support layer may be less than or equal to 150,000 g/mol, less than or equal to 100,000 g/mol, less than or equal to 50,000 g/mol, less than or equal to 30,000 g/mol, less than or equal to 25,000 g/mol, less than or equal to 20,000 g/mol, less than less than or equal to 10,000 g/mol, less than or equal to 5,000 g/mol, or less than or equal to 1,000 g/mol. Other ranges are also possible. Combinations of the above-referenced ranges are also possible (e.g., greater than or equal to about 5,000 g/mol and less than or equal to about 50,000 g/mol).

When polymers are used, the polymer may be substantially crosslinked, substantially uncrosslinked, or partially crosslinked as the current disclosure is not limited in this fashion. Further, the polymer may be substantially crystalline, partially crystalline, or substantially amorphous. Without wishing to be bound by theory, embodiments in which the polymer is amorphous may exhibit smoother surfaces since crystallization of the polymer may lead to increased surface roughness. In certain embodiments, the release layer is formed of or includes a wax.

The polymer materials listed above and described herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance lithium ion conductivity.

As described herein, a support layer may be positioned on a carrier substrate to facilitate fabrication of an electrode. Any suitable material can be used as a carrier substrate. In some embodiments, the material (and thickness) of a carrier substrate may be chosen at least in part due to its ability to withstand certain processing conditions such as high temperature. The substrate material may also be chosen at least in part based on its adhesive affinity to a release layer. In some cases, a carrier substrate is a polymeric material. Examples of suitable materials that can be used to form all or portions of a carrier substrate include certain of those described herein suitable as release layers, optionally with modified molecular weight, cross-linking density, and/or addition of additives or other components. In certain embodiments, a carrier substrate comprises a polyester such as a polyethylene terephthalate (PET) (e.g., optical grade polyethylene terephthalate), polyolefins, polypropylene, nylon, polyvinyl chloride, and polyethylene (which may optionally be metalized). In some cases, a carrier substrate comprises a metal (e.g., a foil such as nickel foil and/or aluminum foil), a glass, or a ceramic material. In some embodiments, a carrier substrate includes a film that may be optionally disposed on a thicker substrate material. For instance, in certain embodiments, a carrier substrate includes one or more films, such as a polymer film (e.g., a PET film) and/or a metalized polymer film (using various metals such as aluminum and copper). A carrier substrate may also include additional components such as fillers, binders, and/or surfactants.

Additionally, a carrier substrate may have any suitable thickness. For instance, the thickness of a carrier substrate may be greater than or equal to about 5 microns, greater than or equal to about 15 microns, greater than or equal to about 25 microns, greater than or equal to about 50 microns, greater than or equal to about 75 microns, greater than or equal to about 100 microns, greater than or equal to about 200 microns, greater than or equal to about 500 microns, or greater than or equal to about 1 mm. In some embodiments, the carrier substrate may have a thickness of less than or equal to about 10 mm, less than or equal to about 5 mm, less than or equal to about 3 mm, or less than or equal to about 1 mm. Combinations of the above-referenced ranges are also possible (e.g., greater than or equal to about 100 microns and less than or equal to about 1 mm.) Other ranges are also possible. In some cases, the carrier substrate has a thickness that is equal to or greater than the thickness of the release layer.

In certain embodiments, the one or more carrier substrates may be left intact with an electrode after fabrication of the electrode, but may be delaminated before the electrode is incorporated into an electrochemical cell. For instance, the electrode may be packaged and shipped to a manufacturer who may then incorporate the electrode into an electrochemical cell. In such embodiments, the electrode may be inserted into an air and/or moisture-tight package to prevent or inhibit deterioration and/or contamination of one or more components of the electrode structure. Allowing the one or more carrier substrates to remain attached to the electrode can facilitate handling and transportation of the electrode. For instance, the carrier substrate(s) may be relatively thick and have a relatively high rigidity or stiffness, which can prevent or inhibit the electrode from distorting during handling. In such embodiments, the carrier substrate(s) can be removed by the manufacturer before, during, or after assembly of an electrochemical cell.

As described herein, in some embodiments, an electrode may be positioned in an electrochemical cell that includes one or more separators. In some embodiments, an electrode may be positioned in an electrochemical cell that includes two separators. Without wishing to be bound by theory, in some embodiments the addition of a second separator to an electrochemical cell may help prevent dendrite formation, may compensate for any mechanical weakness in the first separator due to its thickness, and/or may compensate for any damage (e.g., a pinprick hole, a tear) that it may have incurred during processing to form an electrochemical cell in which it is positioned. In some embodiments, it may be preferable to use two thin separators than to use one thick separator having the same overall thicknesses as the two thin separators. When more than one separator is present, each separator may individually have some, all, or none of the properties listed below. Each separator present may be substantially similar in composition and/or morphology to any other separator present, or may be substantially different in composition and/or morphology from any other separator present. The separator(s) generally comprise a polymeric material (e.g., polymeric material that does or does not swell upon exposure to electrolyte). In some embodiments, the separator(s) are located between the electrolyte and an electrode (e.g., a first electrode, a second electrode, an anode, a cathode).

The separator(s) can be configured to inhibit (e.g., prevent) physical contact between a first electrode and a second electrode, which could result in short circuiting of the electrochemical cell. The separator(s) can be configured to be substantially electronically non-conductive, which can inhibit the degree to which the separator causes short circuiting of the electrochemical cell. In certain embodiments, all or portions of the separator(s) can be formed of a material with a bulk electronic resistivity of greater than or equal to $10^4$ Ohm*meter, greater than or equal to $10^5$ Ohm*meter, greater than or equal to $10^{10}$ Ohm*meter, greater than or equal to $10^{15}$ Ohm*meter, or greater than or equal to $10^{20}$ Ohm*meter. Bulk electronic resistivity may be measured at room temperature (e.g., 25 degrees Celsius).

In some embodiments, the separator(s) can be conductive to lithium ions, while in other embodiments, the separator(s) are substantially non-conductive to lithium ions. In some embodiments, the average lithium ion conductivity of one or more of the separator(s) is $10^{-7}$ S/cm, $10^{-6}$ S/cm, $10^{-5}$ S/cm, $10^{-4}$ S/cm, $10^{-2}$ S/cm, $10^{-1}$ S/cm. In certain embodiments, the average lithium ion conductivity of one or more of the separator(s) may be less than or equal to 1 S/cm, less than or equal to $10^{-1}$ S/cm, less than or equal to $10^{-2}$ S/cm, less than or equal to $10^{-3}$ S/cm, less than or equal to $10^{-4}$ S/cm, less than or equal to $10^{-5}$ S/cm, less than or equal to $10^{-6}$ S/cm, less than or equal to $10^{-7}$ S/cm, or less than or equal to $10^{-8}$ S/cm. Combinations of the above-referenced ranges are also possible (e.g., an average lithium ion conductivity of greater than or equal to $10^{-8}$ S/cm and less than or equal to $10^{-1}$ S/cm). Other values of lithium ion conductivity are also possible. Conductivity may be measured by using EIS spectroscopy as described above.

In some embodiments, the separator(s) can be solid. The separator(s) may be porous to allow an electrolyte solvent to pass through it. In some cases, one or more of the separator(s) do not substantially include a solvent (like in a gel), except for solvent that may pass through or reside in the pores of the separator(s). In other embodiments, a separator may be in the form of a gel.

A separator can be made of a variety of materials. The separator(s) may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The mechanical and electronic properties (e.g., conductivity, resistivity) of these polymers are known. Accordingly, those of ordinary skill in the art can choose suitable materials based on their mechanical and/or electronic properties (e.g., ionic and/or electronic conductivity/resistivity), and/or can modify such polymers to be ionically conducting (e.g., conductive towards single ions) based on knowledge in the art, in combination with the description herein. For example, the polymer materials listed above and herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), and/or others described herein, to enhance lithium ion conductivity, if desired.

The separator(s) may be porous. In some embodiments, the average pore size of the separator may be, for example, less than 5 microns. In some embodiments, the pore size may be less than or equal to 5 microns, less than or equal to 1 micron, less than or equal to 500 nm, less than or equal to 300 nm, less than or equal to 100 nm, or less than or equal to 50 nm. In some embodiments, the average pore size of the separator may be greater or equal to than 50 nm, greater than or equal to 100 nm, greater than or equal to 300 nm, greater than or equal to 500 nm, or greater than or equal to 1 micron. Other values are also possible. Combinations of the above-noted ranges are also possible (e.g., a pore size of less than or equal to 300 nm and greater than or equal to 100 nm). In certain embodiments, the separator may be substantially non-porous. The pore size of the separator may be determined using ASTM standard D4284-07 as described above.

As described above, in some embodiments, an electrode may be positioned in an electrochemical cell that further includes a second electrode. In some embodiments, the electroactive material within a second electrode (e.g., a cathode active electrode species in a cathode of an electrochemical cell described herein) can comprise metal oxides. In some embodiments, an intercalation electrode (e.g., a lithium-intercalation cathode) may be used (e.g., as a second electrode). Non-limiting examples of suitable materials that may intercalate ions of an electroactive material (e.g., alkaline metal ions) include oxides, titanium sulfide, and iron sulfide. In some embodiments, the second electrode may comprise an intercalation electrode that comprises a lithium transition metal oxide or a lithium transition metal phosphate. Additional examples include Li$_x$CoO$_2$, Li$_x$NiO$_2$, Li$_x$MnO$_2$, Li$_x$MnO$_4$, Li$_x$CoPO$_4$, Li$_x$MnPO$_4$, LiCo$_x$Ni$_{(1-x)}$O$_2$, LiCo$_x$Ni$_y$Mn$_{(1-x-y)}$O$_2$ (e.g., LiNi$_{1/3}$Mn$_{1/3}$Co$_{1/3}$O$_2$, LiNi$_{3/5}$Mn$_{1/5}$Co$_{1/5}$O$_2$, LiNi$_{4/5}$Mn$_{1/10}$Co$_{1/10}$O$_2$, LiNi$_{1/2}$Mn$_{3/10}$Co$_{1/5}$O$_2$), Li$_x$NiPO$_4$, where (0<x≤1), LiMn$_x$Ni$_y$O$_4$ where (x+y=2) (e.g., LiMn$_{1.5}$Ni$_{0.5}$O$_4$), LiNi$_x$Co$_y$Al$_z$O$_2$ where (x+y+z=1), LiFePO$_4$, and combinations thereof. In some embodiments, the electroactive material within the second electrode can comprise lithium transition metal phosphates (e.g., LiFePO$_4$), which can, in certain embodiments, be substituted with borates and/or silicates.

In certain embodiments, the electroactive material within a second electrode (e.g., a cathode active electrode species in a cathode of an electrochemical cell described herein) can comprise electroactive transition metal chalcogenides, electroactive conductive polymers, and/or electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a second electrode (e.g., as a cathode active electrode species in the cathode of the electrochemical cells described herein) can comprise an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In certain embodiments, it may be desirable to use polypyrroles, polyanilines, and/or polyacetylenes as conductive polymers.

In some embodiments, an electrochemical cell described herein is designed to include a second electrode with an electroactive material (e.g., a cathode active electrode species in a cathode of an electrochemical cell described herein) having a moderate voltage with respect to lithium metal. The voltage of an electroactive material with respect to lithium metal may be measured by first cycling an electrochemical cell comprising the electroactive material and lithium metal at least four times (e.g., 5 times, 6 times, 8 times, 10 times) at a rate of C/5, then discharging the electrochemical cell at a rate of C/5 and measuring the voltage as the cell discharges. The average voltage measured over the discharge process is then determined, and this value is considered to be the voltage with respect to lithium metal. In certain embodiments, the electroactive material within the second electrode has a voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In some embodiments, an electrochemical cell described herein is designed to include a second electrode with an electroactive material (e.g., a cathode active electrode species in a cathode of an electrochemical cell described herein) having a moderate open circuit voltage with respect to lithium metal. The open circuit voltage of an electroactive material with respect to lithium metal may be measured by determining the open circuit voltage of a battery comprising the electroactive material and lithium metal when the battery is charged to half its capacity. This may be accomplished by first determining the capacity of the battery by cycling the battery to determine its capacity. The battery can then be charged to half of its measured capacity and allowed to rest for two minutes. After these steps, the open circuit voltage may be measured. In certain embodiments, the electroactive material within the second electrode has an open circuit voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has an open circuit voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

Characteristics of electroactive materials (e.g., for a second electrode) other than their voltages and open circuit voltages with respect to lithium may also be relevant in some embodiments. For example, in some embodiments, an electrochemical cell may include a second electrode comprising an electroactive material (e.g., a cathode active electrode species in a cathode of an electrochemical cell described herein) that exhibits one or more plateaus in the value of voltage with respect to lithium as a function of cycle life during charging and/or discharging, and the value of the plateau(s) may be one or more of the values described above in relation to the voltage of the material with respect to lithium metal. As used herein, an electroactive material exhibits a plateau (i.e., a plateau voltage) when it shows a constant or substantially constant voltage (e.g., varying by less than or equal to 10%, or less than or equal to 5%) with respect to lithium during at least some portion of a charging and/or discharging procedure. The voltage at which a plateau occurs for an electroactive material (i.e., a plateau voltage) may be determined by employing the same procedure used to determine the voltage of an electroactive material with respect to lithium metal, evaluating whether any regions consistent with plateaus are observed, and determining the average voltage in those region(s) if present. In certain embodiments, the electroactive material within the second electrode has a plateau voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a plateau voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

As another example, the electrochemical cell may include a second electrode comprising an electroactive material that would be suitable for charging to less than 5 V, less than 4.5 V, less than 4 V, or less than 3.5 V under normal operating conditions (e.g., if one were to charge to, e.g., 5 V, 4.5 V, 4 V, or 3.5 V or higher, respectively, it would typically be considered an abuse test, would not be recommended by the manufacturer, and/or would present safety concerns).

In some embodiments, one or more of the voltages measured during the charge and/or discharge process in a cell comprising a lithium metal electrode (e.g., maximum voltage, minimum voltage, median voltage, modal voltage) may have one or more of the values described above in relation to the average voltage. In certain embodiments, the electroactive material within the second electrode has a maximum voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a maximum voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In certain embodiments, the electroactive material within the second electrode has a minimum voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a minimum voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In certain embodiments, the electroactive material within the second electrode has a median voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a median voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In certain embodiments, the electroactive material within the second electrode has a modal voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In certain embodiments, the electroactive material within the second electrode has a modal voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

Table 1, below, shows the voltage with respect to lithium metal of several cathode materials.

TABLE 1

| Material | Voltage (V) |
|---|---|
| FeS | 1.2-1.5 |
| $FeS_2$ | 1.4-1.6 |
| $BiPb_2O_5$ | 1.5 |
| $Bi_2O_3$ | 1.5 |
| CuO | 1.5 |
| CuS | 1.5 |
| PbCuS | 1.5 |
| Electroactive conductive polymers | <2-3.7 |
| Transition metal sulfides and selenides | 1.2-2.1 |
| Sulfur | 2.1-2.2 |
| $Ag_2V_4O_{11}$ | 2.5 (first plateau); 1.5 (second plateau) |
| $I_2$ | 2.8 |
| $SO_2$ | 2.85 |
| $MnO_2$ | 3 |
| $(CF)_x$ | 3 |
| $Ag_2CrO_4$ | 3.1 (first plateau); 2.6 (second plateau) |
| $LiFePO_4$ | 3.3 |
| $V_2O_5$ | 3.3 (first plateau); 2.4 (second plateau) |
| $CuCl_2$ | 3.3 (first plateau); 2.9 (second plateau); 2.5 (third plateau) |
| $SOCl_2$ | 3.5 (3.7-3.8 in the presence of BrCl) |
| $SO_2Cl_2$ | 3.7 |
| $CoO_2$ | 4 |
| $LiNi_xMn_xCo_xO_2$ | 4.0 |
| $LiNiO_2$ | 4.0 |
| $LiMn_2O_4$ | 4.1 (first plateau); 3.9 (second plateau) |
| $Li_xMnPO_4$ | 4.1 |
| $LiCoO_2$ | 4.2 |
| $LiMn_{3/2}Ni_{1/2}O_4$ | 4.7-5.1 |
| $LiCoPO_4$ | 4.8 |
| $Li_xNiPO_4$ | 5.1 |

In some embodiments, active electrode materials for use as electroactive materials in second electrodes (e.g., cathodes) in electrochemical cells described herein include electroactive sulfur-containing materials (e.g., lithium-sulfur electrochemical cells). "Electroactive sulfur-containing materials," as used herein, relates to electroactive materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In certain embodiments, the sulfur-containing material (e.g., in an oxidized form) comprises a polysulfide moiety, $S_m$, selected from the group consisting of covalent $S_m$ moieties, ionic $S_m$ moieties, and ionic $S_m^{2-}$ moieties, wherein m is an integer equal to or greater than 3. In some embodiments, m of the polysulfide moiety $S_m$ of the sulfur-containing polymer is an integer equal to or greater than 6 or an integer equal to or greater than 8. In some cases, the sulfur-containing material may be a sulfur-containing polymer. In some embodiments, the sulfur-containing polymer has a polymer backbone chain and the polysulfide moiety $S_m$ is covalently bonded by one or both of its terminal sulfur atoms as a side group to the polymer backbone chain. In certain embodiments, the sulfur-containing polymer has a polymer backbone chain and the polysulfide moiety $S_m$ is incorporated into the polymer backbone chain by covalent bonding of the terminal sulfur atoms of the polysulfide moiety.

In some embodiments, the electroactive sulfur-containing material comprises more than 50% by weight of sulfur. In certain embodiments, the electroactive sulfur-containing material comprises more than 75% by weight of sulfur (e.g., more than 90% by weight of sulfur).

As will be known by those skilled in the art, the nature of the electroactive sulfur-containing materials described herein may vary widely. In some embodiments, the electroactive sulfur-containing material comprises elemental sulfur. In certain embodiments, the electroactive sulfur-containing material comprises a mixture of elemental sulfur and a sulfur-containing polymer.

In certain embodiments, an electrochemical cell as described herein, comprises one or more cathodes comprising sulfur as an electroactive electrode species (e.g., a second electrode). In some such embodiments, the cathode includes elemental sulfur as a electroactive electrode species. In some embodiments, the additive is chosen such that the additive is different from the electroactive species of the first electrode (e.g., the anode) and different from the electroactive species of the second electrode (e.g., of the cathode). In certain embodiments, the additive precursor is chosen such that the additive precursor is different from the electroactive species of the first electrode and different from the electroactive species of the second electrode.

In some embodiments, an electrode as described herein may be positioned in an electrochemical cell that comprises at least one current collector. Materials for the current collector may be selected, in some cases, from metals (e.g., copper, nickel, aluminum, passivated metals, and other appropriate metals), metallized polymers, electrically conductive polymers, polymers comprising conductive particles dispersed therein, and other appropriate materials. The current collector(s) may be adjacent to electrode(s) within the electrochemical cell. In some embodiments, a current collector is adjacent to an electroactive material or layer within an electrode. In certain embodiments, the current collector is deposited onto the electrode layer using physical vapor deposition, chemical vapor deposition, electrochemical deposition, sputtering, doctor blading, flash evaporation, or any other appropriate deposition technique for the selected material. In some cases, the current collector may be formed separately and bonded to the electrode structure. It should be appreciated, however, that in some embodiments a current collector separate from the electroactive layer is not needed or present.

In some embodiments, an electrode is positioned in an electrochemical cell that includes an electrolyte, such as a non-aqueous electrolyte. Suitable non-aqueous electrolytes may include organic electrolytes and/or aprotic electrolytes such as liquid electrolytes, gel polymer electrolytes, and solid polymer electrolytes. These electrolytes may optionally include one or more ionic electrolyte salts (e.g., to provide or enhance lithium ion conductivity) as described herein. Examples of useful non-aqueous liquid electrolyte solvents include, but are not limited to, non-aqueous organic solvents, such as, for example, N-methyl acetamide, acetonitrile, acetals, ketals, esters (e.g., esters of carbonic acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, sulfonimidies (e.g., bis (trifluoromethane)sulfonimide lithium salt), aliphatic ethers, acyclic ethers, cyclic ethers, glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some cases, mixtures of the solvents described herein may also be used. For example, in some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. In certain embodiments, the mixture of solvents comprises dimethyl carbonate and ethylene carbonate. In some embodiments, the mixture of solvents comprises ethylene carbonate and ethyl methyl carbonate. The weight ratio of the two solvents in the mixtures may range, in some cases, from about 5 wt %:95 wt % to 95 wt %:5 wt %. For example, in some embodiments the electrolyte comprises a 50 wt %:50 wt % mixture of dimethyl carbonate:ethylene carbonate. In certain other embodiments, the electrolyte comprises a 30 wt %:70 wt % mixture of ethylene carbonate:ethyl methyl carbonate.

Non-limiting examples of suitable gel polymer electrolytes include polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, cross-linked and network structures of the foregoing, and blends of the foregoing.

Non-limiting examples of suitable solid polymer electrolytes include polyethers, polyethylene oxides, polypropylene oxides, polyimides, polyphosphazenes, polyacrylonitriles, polysiloxanes, derivatives of the foregoing, copolymers of the foregoing, cross-linked and network structures of the foregoing, and blends of the foregoing.

In some embodiments, an electrolyte comprises at least one lithium salt. For example, in some cases, the at least one lithium salt is selected from the group consisting of $LiNO_3$, $LiPF_6$, $LiBF_4$, $LiClO_4$, $LiAsF_6$, $Li_2SiF_6$, $LiSbF_6$, $LiAlCl_4$, lithium bis-oxalatoborate, $LiCF_3SO_3$, $LiN(SO_2F)_2$, $LiC(CnF_{2n+1}SO_2)_3$, wherein n is an integer in the range of from 1 to 20, and $(CnF_{2n+1}SO_2)_mXLi$ with n being an integer in the range of from 1 to 20, m being 1 when X is selected from oxygen or sulfur, m being 2 when X is selected from nitrogen or phosphorus, and m being 3 when X is selected from carbon or silicon.

In some embodiments, the use of certain electrodes, composite protective layers, and/or methods described herein may result in improved capacity after repeated cycling of an electrochemical cell. For example, in some embodiments, after alternatively discharging and charging the cell three times, the cell exhibits at least about 50%, at least about 80%, at least about 90%, or at least about 95% of the cell's initial capacity at the end of the third cycle. In some cases, after alternatively discharging and charging the cell ten times, the cell exhibits at least about 50%, at least about 80%, at least about 90%, or at least about 95% of the cell's initial capacity at the end of the tenth cycle. In still further cases, after alternatively discharging and charging the cell twenty-five times, the cell exhibits at least about 50%, at least about 80%, at least about 90%, or at least about 95% of the cell's initial capacity at the end of the twenty-fifth cycle. In some embodiments, the electrochemical cell has a capacity of at least 20 mAh at the end of the cell's third, 10th, 25th, 30th, 40th, 45th, 50th, or 60th cycle.

In some embodiments, an electrochemical cell comprising a composite protective layer as described herein may have a higher cycle life than an otherwise equivalent electrochemical cell lacking the composite protective layer. The cycle life may be greater than or equal to 15% larger than an otherwise equivalent electrochemical cell lacking the composite protective layer, greater than or equal to 20% larger than an otherwise equivalent electrochemical cell lacking the composite protective layer, greater than or equal to 30% larger than an otherwise equivalent electrochemical cell lacking the composite protective layer, greater than or equal to 40% larger than an otherwise equivalent electrochemical cell lacking the composite protective layer, greater than or equal to 50% larger than an otherwise equivalent electrochemical cell lacking the composite protective layer, greater than or equal to 60% larger than an otherwise equivalent electrochemical cell lacking the composite protective layer, greater than or equal to 75% larger than an otherwise equivalent electrochemical cell lacking the composite protective layer, greater than or equal to 100% larger than an otherwise equivalent electrochemical cell lacking the composite protective layer, greater than or equal to 115% larger than an otherwise equivalent electrochemical cell lacking the composite protective layer, greater than or equal to 125% larger than an otherwise equivalent electrochemical cell lacking the composite protective layer, greater than or equal to 150% larger than an otherwise equivalent electrochemical cell lacking the composite protective layer, greater than or equal to 175% larger than an otherwise equivalent electrochemical cell lacking the composite protective layer, greater than or equal to 200% larger than an otherwise equivalent electrochemical cell lacking the composite protective layer, greater than or equal to 225% larger than an otherwise equivalent electrochemical cell lacking the composite protective layer, greater than or equal to 250% larger than an otherwise equivalent electrochemical cell lacking the composite protective layer, or greater than or equal to 275% larger than an otherwise equivalent electrochemical cell lacking the composite protective layer. The cycle life may be less than or equal to 300% larger than an otherwise equivalent electrochemical cell lacking the composite protective layer, less than or equal to 275% larger than an otherwise equivalent electrochemical cell lacking the composite protective layer, less than or equal to 250% larger than an otherwise equivalent electrochemical cell lacking the composite protective layer, less than or equal to 225% larger than an otherwise equivalent electrochemical cell lacking the composite protective layer, less than or equal to 200% larger than an otherwise equivalent electrochemical cell lacking the composite protective layer, less than or equal to 175% larger than an otherwise equivalent electrochemical cell lacking the composite protective layer, less than or equal to 150% larger than an otherwise equivalent electrochemical cell lacking the composite protective layer, less than or equal to 125% larger than an otherwise equivalent electrochemical cell lacking the composite protective layer, less than or equal to 115% larger than an otherwise equivalent electrochemical cell lacking the composite protective layer, less than or equal to 100% larger than an otherwise equivalent electrochemical cell lacking the composite protective layer, less than or equal to 75% larger than an otherwise equivalent electrochemical cell lacking the composite protective layer, less than or equal to 60% larger than an otherwise equivalent electrochemical cell lacking the composite protective layer, less than or equal to 50% larger than an otherwise equivalent electrochemical cell lacking the composite protective layer, less than or equal to 40% larger than an otherwise equivalent electrochemical cell lacking the composite protective layer, or less than or equal to 30% larger than an otherwise equivalent electrochemical cell lacking the composite protective layer. Combinations of the above-referenced ranges are also possible (e.g., greater than or equal to 15% and less than or equal to 300% larger than an otherwise equivalent electrochemical cell lacking the composite protective layer, greater than or equal to 60% and less than or equal to 115% larger than an otherwise equivalent electrochemical cell lacking the composite protective layer). Other ranges are also possible.

In some embodiments, the electrochemical cell as a whole has a relatively low impedance prior to cycling. The electrochemical cell as a whole may have an initial impedance of less than or equal to 1.0 Ohm, less than or equal to 0.75 Ohms, less than or equal to 0.5 Ohms, or less than or equal to 0.2 Ohms. The electrochemical cell as a whole may have an initial impedance of greater than or equal to 0.1 Ohms, greater than or equal to 0.2 Ohms, greater than or equal to 0.5 Ohms, or greater than or equal to 0.75 Ohms. Combinations of the above-referenced ranges are also possible (e.g., less than or equal to 1.0 Ohm and greater than or equal to 0.1 Ohms, or less than or equal to 0.5 Ohms and greater than or equal to 0.2 Ohms). Other ranges are also possible. Impedance may be measured by using EIS as described herein.

In some embodiments, the electrochemical cell as a whole has a relatively low impedance prior to cycling compared to an otherwise equivalent electrochemical cell lacking the composite protective layer. The electrochemical cell as a whole may have an initial impedance of less than or equal to 90% of the impedance of an otherwise equivalent electrochemical cell lacking the composite protective layer, less than or equal to 75% of the impedance of an otherwise equivalent electrochemical cell lacking the composite protective layer, less than or equal to 50% of the impedance of an otherwise equivalent electrochemical cell lacking the composite protective layer, or less than or equal to 25% of the impedance of an otherwise equivalent electrochemical cell lacking the composite protective layer. The electrochemical cell as a whole may have an initial impedance of greater than or equal to 10% of the impedance of an otherwise equivalent electrochemical cell lacking the composite protective layer, greater than or equal to 25% of the impedance of an otherwise equivalent electrochemical cell lacking the composite protective layer, greater than or equal to 50% of the impedance of an otherwise equivalent electrochemical cell lacking the composite protective layer, or greater than or equal to 75% of the impedance of an otherwise equivalent electrochemical cell lacking the composite protective layer. Combinations of the above-referenced ranges are also possible (e.g., less than or equal to 90% and greater than or equal to 10% of the impedance of an otherwise equivalent electrochemical cell lacking the composite protective layer). Other ranges are also possible. Impedance may be measured by using EIS as described herein.

The following examples are intended to illustrate certain embodiments of the present invention, but do not exemplify the full scope of the invention.

EXAMPLE 1

This Example describes the formation of electrochemical cells including electrodes comprising composite protective layers comprising nanographite particles.

To form electrochemical cells with designs A-B and D-E, composite protective layers were formed by depositing a slurry comprising nanographite particles with an average lateral particle size between 10 and 300 nm (less than 50 nm in some cases) and an average thickness of between 2 and 500 nm (less than 50 nm in some cases), polymer binder (e.g. Kraton 1924 FG or styrene-butadiene rubber), and a solvent for the polymer binder onto a first separator (Celgard 2400) which was disposed on a carrier substrate of PET on glass. The nanographite particles and polymer binder together made up 5-20 wt % of the slurry; the nanographite made up between 2.5-18 wt % of the slurry (4.5-15 wt % in some cases) and the polymer binder made up 0.05-10 wt % of the slurry (0.5-5 wt % in some cases). Slurries were deposited using either an air brushing technique or a Mayer rod, and uniformly coated the carrier substrate. The coating was allowed to air dry for several hours, and then placed in a vacuum oven for several hours at a reduced pressure and at a temperature between room temperature and 130° C. Then, a 15 micron-thick Li layer was vacuum deposited onto the composite protective layer. The Li/composite protective layer/first separator structure was then released from the carrier substrate. In this embodiment, the PET layer and the glass substrate were not incorporated into the final electrochemical cell. A second separator, a 9 micron-thick Tonen separator, was placed between the first separator (Celgard 2400) and an LCO (LiCoO$_2$) or LFP (LiFePO$_4$) cathode to form a Li/composite protective layer/first separator/second separator/cathode structure. Bilayer cathode-centered cells and triple bilayer cathode-centered cells were assembled and cycled. The triple bilayer cells included three stacks of cathode-centered bilayer cells.

Control electrochemical cells (designs C and F) were fabricated by the procedure described below. A first separator (Celgard 2400) disposed on a carrier substrate of PET on glass was placed in a vacuum oven for several hours at a reduced pressure and at a temperature between room temperature and 130° C. Then, a 15 micron-thick Li layer was vacuum deposited onto the first separator. The Li/first separator structure was then released from the carrier substrate; the PET and glass were not incorporated into the final electrochemical cell. A second separator, a 9 micron-thick Tonen separator, was placed between the first separator (Celgard 2400) and an LCO or LFP cathode to form a Li/first separator/second separator/cathode structure. Bilayer cathode-centered cells and triple bilayer cathode-centered cells were assembled and cycled. Table 2, below, describes properties of the cells and control cells.

TABLE 2

| Cell | Protective layer composition | Bilayer or triple bilayer | Cathode type | Ratio of cycle life to cycle life of control cells | Initial electrochemical cell impedance (Ohms) |
| --- | --- | --- | --- | --- | --- |
| Design A | 90 wt % nanographite; 10 wt % Kraton 1924 FG | Bilayer | LFP | 1.4-1.7 | 2.06-2.21 |
| Design B | 80 wt % nanographite; 20 wt % Kraton 1924 FG | Bilayer | LFP | 1.4-1.7 | 8.2-10.8 |
| Design C | N/A | Bilayer | LFP | N/A | 32.7-48.8 |
| Design D | 90 wt % nanographite; 10 wt % Kraton 1924 FG | Triple bilayer | LCO | 1.6-2.7 | 0.32-0.6 |
| Design E | 80 wt % nanographite; 20 wt % Kraton 1924 FG | Triple bilayer | LCO | 1.6-2.7 | 0.83-1.03 |
| Design F | N/A | Triple bilayer | LCO | N/A | 7.88-9.0 |

Figure 9:
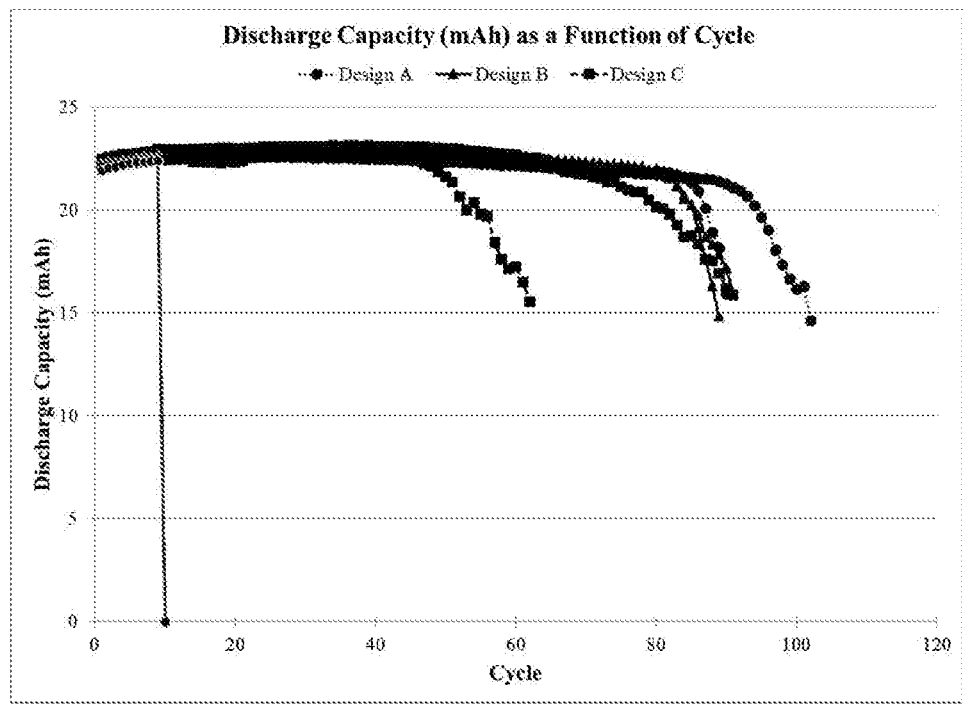
FIGS. 9-10 show discharge capacity as a function of cycle for certain electrochemical cells.
Figure 10:
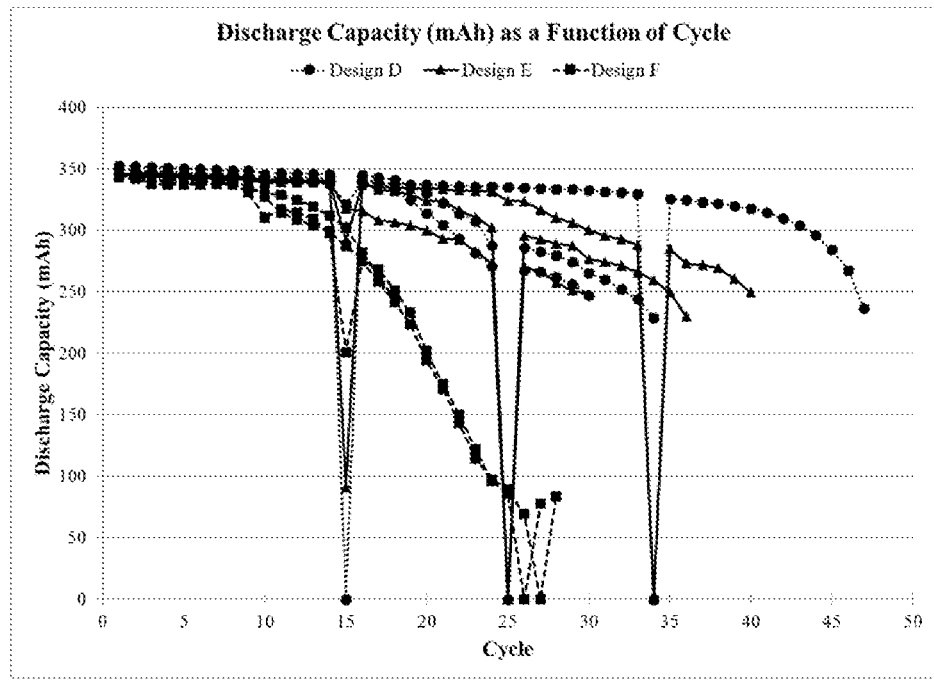
Figure 11:
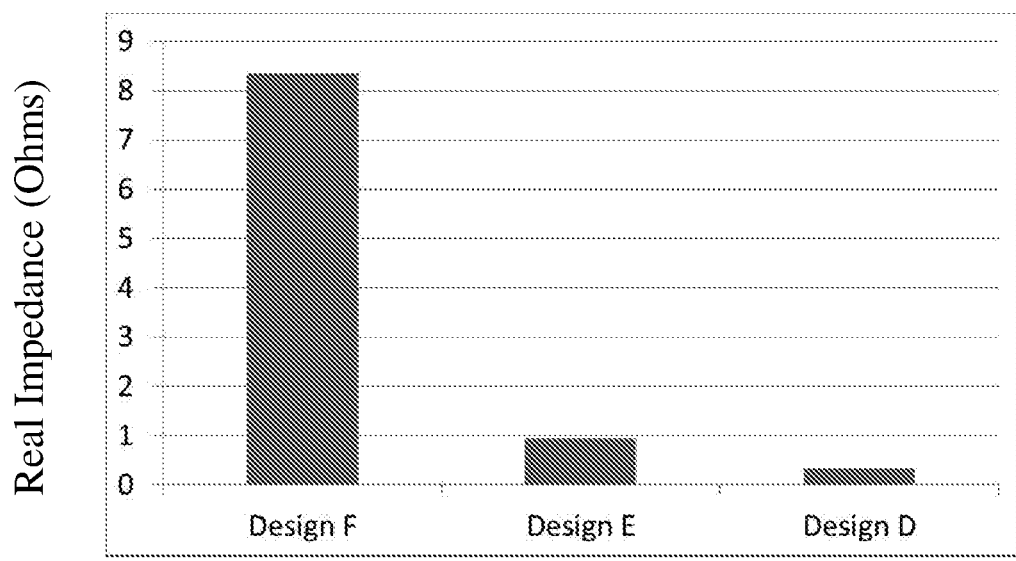
FIGS. 11-12 show impedance values for certain electrochemical cells.
Figure 12:
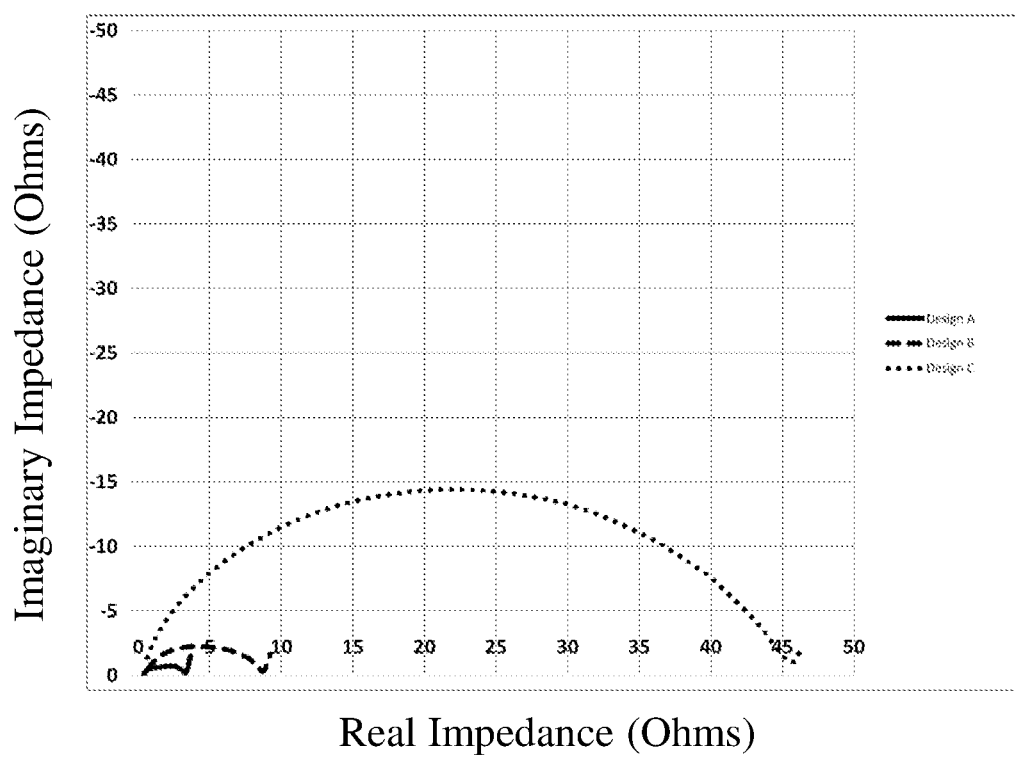

Cells that included the composite protective layer had a longer cycle life and lower impedance than the control cells that did not include the composite protective layer. FIGS. 9 and 12 show cycle life data and initial impedance data, respectively, from individual electrochemical cells with designs A-C; FIGS. 10 and 11 show cycle life and initial impedance data, respectively, from individual electrochemical cells with designs D-F. The cycle life of cells including an electrode comprising a composite protective layer was larger than cells lacking the composite protective layer and the cells including an electrode comprising a composite protective layer had significantly reduced impedance in comparison to electrochemical cells lacking a composite protective layer.

EXAMPLE 2

This Example describes the formation of electrochemical cells including electrodes comprising composite protective layers comprising nanographite.

Bilayer electrochemical cells including an LFP cathode and comprising protective layers were prepared as in Example 1, except that the lithium layer (15 micron-thick) was laminated onto the composite protective layer instead of vapor deposited onto the protective layer. Control electrochemical cells were prepared as in Example 1, except that the lithium layer (15 micron-thick) was laminated onto the first separator instead of vapor deposited onto the first separator. Cells that included the composite protective layer had initial impedances of between 0.26 and 1 Ohms; control cells had initial impedances between 1.3 and 5.1 Ohms. The cycle life of the cells including the composite protective layer was between 40% and 70% larger than the control cells lacking the composite protective layer.

EXAMPLE 3

This Example describes the formation of electrochemical cells including electrodes comprising composite protective layers comprising nanographite.

Bilayer electrochemical cells including an LFP cathode and comprising protective layers were prepared as in Example 1, except that the first separator was a 9 micron-thick Tonen separator instead of a Celgard 2400 separator, the second separator was a Celgard 2400 separator instead of a 9 micron-thick Tonen separator, and that a lithium layer (15 micron-thick) was laminated onto the composite protective layer instead of vapor deposited onto the protective layer. Control electrochemical cells were prepared as in Example 1, except that the lithium layer (15 micron-thick) was laminated onto the first separator instead of vapor deposited onto the first separator. Cells that included the composite protective layer had initial impedances of between 0.26 and 1 Ohms; control cells had initial impedances between 1.3 and 5.1 Ohms. The cycle life of the cells including the composite protective layer was between 40% and 70% larger than the control cells lacking the composite protective layer.

EXAMPLE 4

This Example describes the formation of electrochemical cells including electrodes comprising composite protective layers comprising nanographite.

Triple bilayer electrochemical cells including an LCO cathode and comprising protective layers were prepared as in Example 1, except that the slurry used to form the composite protective layer included a water-based colloidal dispersion comprising fine lamellar graphite particles with an average particle size between 0.5 microns and 1 micron, a polymeric binder, and ammonium hydroxide (Aquadag E) instead of nanographite particles and that the lithium layer was laminated onto the composite protective layer instead of vapor deposited onto the protective layer. Control electrochemical cells lacking composite protective layers were prepared as in Example 1, except that the lithium layer was laminated onto the separator instead of vapor deposited onto the protective layer. Cells that included the composite protective layer had initial impedances between 0.15 and 0.17 Ohms; control cells had initial impedances between 1.56 and 1.8 Ohms.

EXAMPLE 5

This Example describes the formation of electrochemical cells including electrodes comprising composite protective layers comprising nanographite particles.

Composite protective layers were formed by depositing a 5-20 wt % slurry comprising nanographite particles, polymer binder (e.g. Kraton 1924 FG or styrene-butadiene rubber), and a solvent for the polymer binder onto a 15 micron-thick vacuum deposited lithium layer disposed on a carrier substrate of PET on glass. The nanographite particles and polymer binder together made up 5-20 wt % of the slurry. Slurries were deposited using either an air brushing technique or a Mayer rod, and uniformly coated the carrier substrate. The coating was allowed to air dry for several hours, and then placed in a vacuum oven for several hours at a reduced pressure and at a temperature between room temperature and 130° C. Then, the Li/composite protective layer structure was released from the carrier substrate, with the PET and glass not being incorporated into the final electrochemical cell. After this step, a first separator (either Celgard 2400 or a 9 micron-thick Tonen separator) was placed on the composite protective layer, and a second separator (a 9 micron-thick Tonen separator) was placed on the first separator (Celgard 2400). Then, a cathode such as an LCO or LFP cathode was placed on the second separator. Bilayer cathode-centered cells and triple bilayer cathode-centered cells including an LFP cathode were assembled and cycled.

Control electrochemical cells were fabricated by the procedure described below. A separator (Celgard 2400) was allowed to air dry for several hours before being placed in a vacuum oven for several hours at a reduced temperature and at a temperature of 50° C. or higher. The first separator was placed then placed on a released 15 micron vapor deposited lithium anode, and a second separator (a 9 micron-thick Tonen separator) was placed on the first separator. A cathode, such as an LCO or LFP cathode, was placed on the second separator after this step. Bilayer cathode-centered cells and triple bilayer cathode-centered cells were assembled and cycled.

Cells that included the composite protective layer had initial impedances of between 0.154 and 0.3 Ohms (less than 1 Ohm in all cases); control cells had initial impedances between 1.6 and 2 Ohms. The cycle life of the cells including the composite protective layer was between 70% and 160% larger than the control cells lacking the composite protective layer.

EXAMPLE 6

This Example describes the formation of electrochemical cells including electrodes comprising composite protective layers comprising boron particles.

Composite protective layers were formed by depositing a 5-20% slurry composed of boron submicron particles, polymer binder (e.g. Kraton 1924 FG or styrene-butadiene rubber), and a solvent for the polymer binder onto a first separator (Celgard 2400), disposed on a carrier substrate of PET on glass. The boron submicron particles had an average particle size of between 50 nm and 1 micron, and/or between 80 nm and 1 micron. Slurries were deposited using an air brushing technique or a Mayer rod, and uniformly coated the carrier substrate. The coating was allowed to air dry for several hours, and then placed in a vacuum oven for several hours at a reduced pressure and at a temperature between room temperature and 130° C. A 2-3 micron-thick Li layer was then sputtered onto the composite protective layer-coated separator. A 15 micron-thick vapor deposited Li anode was then laminated with the lithium and composite protective layer-coated separator. The Li/Li/composite protective layer/separator structure was released from the carrier substrate, with the PET and glass not being incorporated into the final electrochemical cell. A second separator (a 9 micron-thick Tonen separator), was placed between the first separator and an NCM 622 cathode to form a Li/Li/composite protective layer/first separator/second separator/cathode structure. Two triple bilayer cathode-centered cells were assembled and cycled: Design G, with a protective layer including 80 wt % boron submicron particles and 20 wt % Kraton 1924 FG; and Design H, with a protective layer including 90 wt % boron submicron particles and 10 wt % Kraton 1924 FG.

Control electrochemical cells (Design I) were fabricated by the procedure described below. A separator (Celgard 2400) was allowed to air dry for several hours before being placed in a vacuum oven for several hours at a reduced temperature and at a temperature between room temperature and 130° C. A 2-3 micron Li layer was then sputtered on the separator. A released 15 micron vapor deposited lithium anode was then laminated with the lithium-coated separator. An additional separator, 9 micron Tonen, was placed between the Celgard 2400 separator and an NCM 622 cathode. Triple bilayer cathode-centered cells were assembled and cycled. Table 3, below, describes properties of the cells and control cells.

optionally, polymer binder (e.g. Kraton 1924 FG or styrene-butadiene rubber) onto a first separator (Celgard 2400), disposed on a carrier substrate of PET on glass. The submicron particles were either exclusively nanographite particles, or a mixture of nanographite particles and boron particles where the boron particles made up between 25 wt % and 75 wt % of the total particle mass. Slurries were deposited using an air brushing technique or a Mayer rod, and uniformly coated the carrier substrate. The coating was allowed to air dry for several hours, and then placed in a vacuum oven for several hours at a reduced pressure and at a temperature between room temperature and 130° C. A 2-3 micron-thick Li layer was then sputtered onto the composite protective layer-coated separator. A 15 micron-thick vapor deposited Li anode was then laminated with the lithium and composite protective layer-coated separator. The Li/Li/composite protective layer/separator structure was released from the carrier substrate, with the PET and glass not being incorporated into the final electrochemical cell. A second separator (a 9 micron-thick Tonen separator), was placed between the first separator and an NCM 622 cathode to form a Li/Li/composite protective layer/first separator/second separator/cathode structure.

TABLE 3

| Cell | Protective layer composition | Bilayer or triple bilayer | Cathode type | Initial electrochemical cell impedance (Ohms) |
| --- | --- | --- | --- | --- |
| Design G | 80 wt % boron; 20 wt % Kraton 1924 FG | Triple bilayer | NCM | 0.29-0.34 |
| Design H | 90 wt % boron; 10 wt % Kraton 1924 FG | Triple bilayer | NCM | 0.33-0.63 |
| Design I | N/A | Triple bilayer | NCM | 1.6-2.1 |

Figure 13:
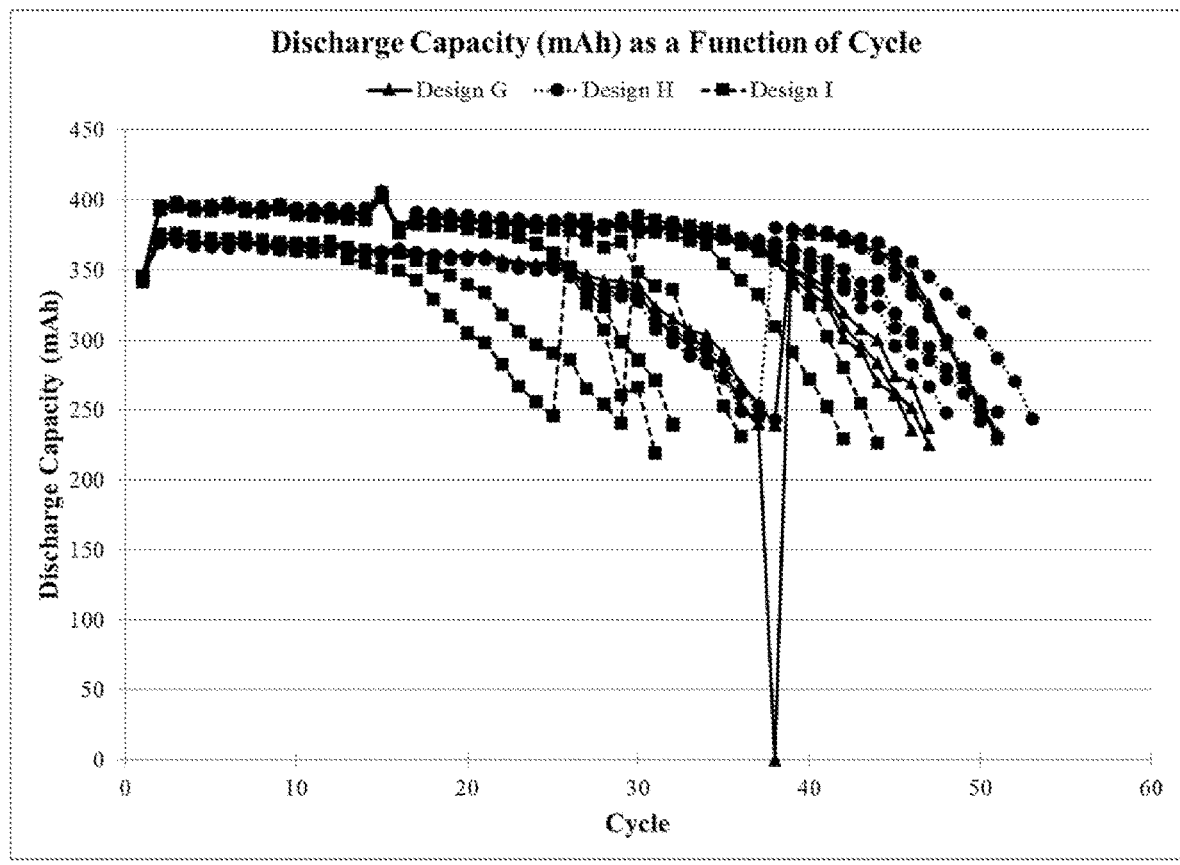
FIGS. 13-15 show discharge capacity as a function of cycle for certain electrochemical cells.

Cells that included the composite protective layer had a longer cycle life and lower impedance than cells that did not include the composite protective layer (see FIG. 13). Initial impedances of composite protective layer-containing cells were between 0.3 Ohms and 1 Ohms. Control cells, which did not contain boron membranes, had initial impedances between 1.6 Ohms and 2.1 Ohms. The cycle life of cells including an electrode comprising a composite protective layer was between 60% and 170% larger than control cells lacking the composite protective layer.

EXAMPLE 7

This Example describes the formation of electrochemical cells including electrodes comprising composite protective layers comprising mixtures of boron and nanographite particles.

Figure 14:
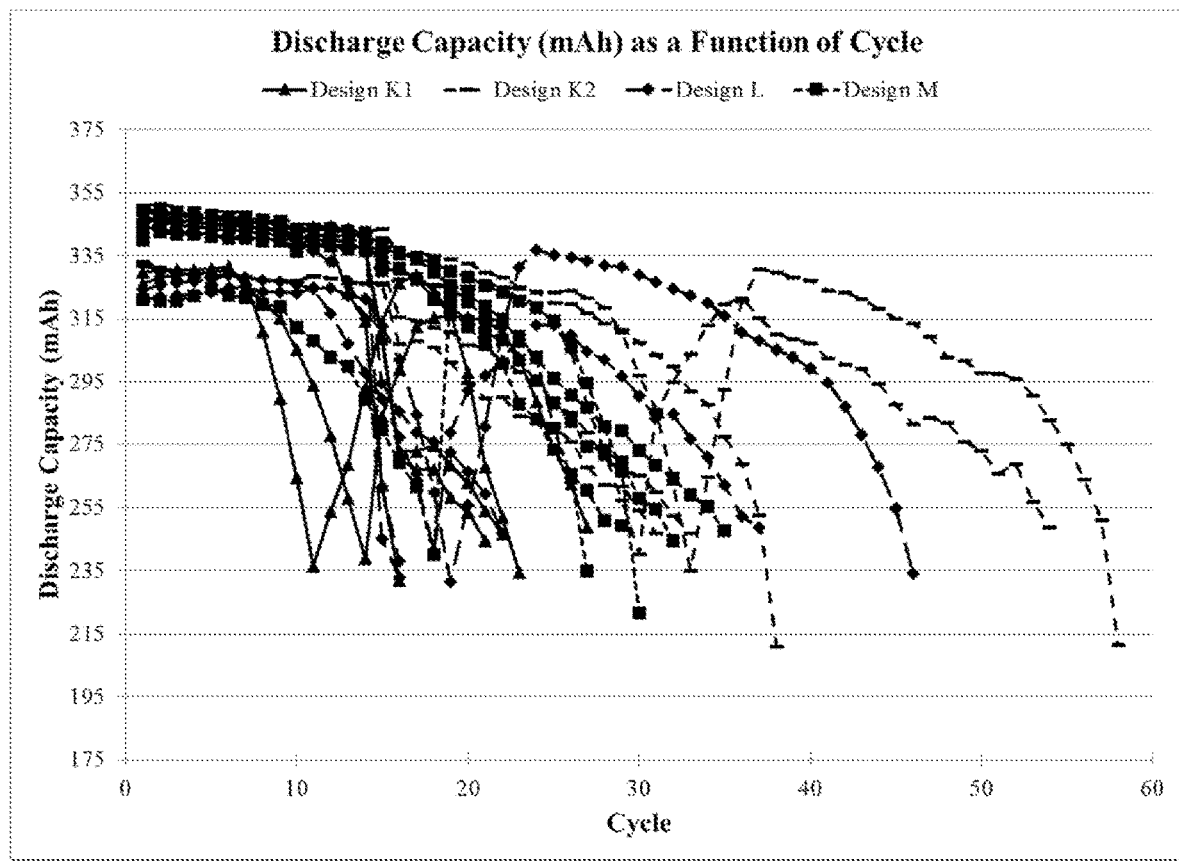
Figure 15:
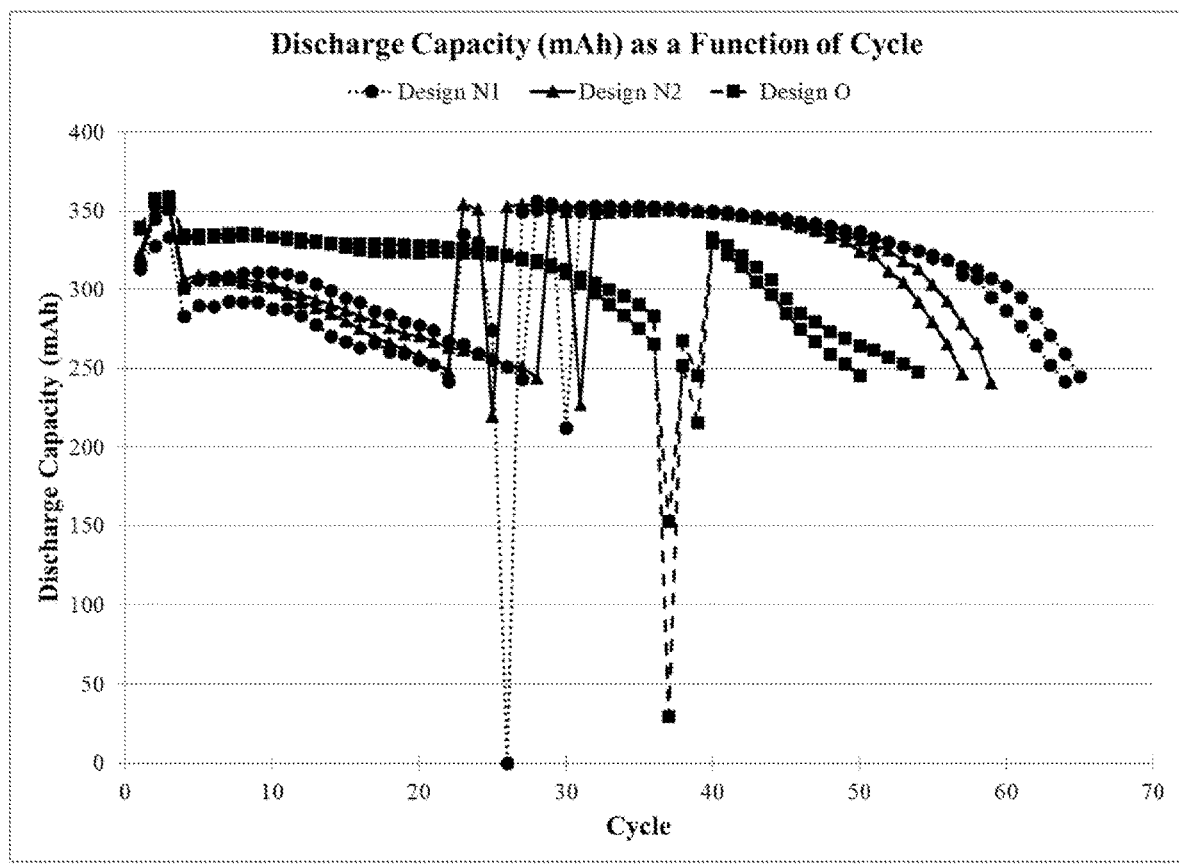

Composite protective layers were formed by depositing a 5-20% slurry composed of submicron particles, a fluid, and, Control electrochemical cells were fabricated by the procedure described below. A separator (Celgard 2400) was allowed to air dry for several hours before being placed in a vacuum oven for several hours at a reduced temperature and at a temperature between room temperature and 130° C. A 2-3 micron Li layer was then sputtered on the separator. A released 15 micron vapor deposited lithium anode was then laminated with the lithium-coated separator. An additional separator, 9 micron Tonen, was placed between the Celgard 2400 separator and an NCM 622 cathode. Triple bilayer cathode-centered cells were assembled and cycled. Table 4, below, describes the properties of the cells and control cells. FIG. 14 shows the cycle lives of cells and control cells from a first track which were prepared as described above; FIG. 15 shows the cycle lives of cells and control cells from a second track which were prepared as described above.

TABLE 4

| Cell | Protective layer composition | Bilayer or triple bilayer | Cathode type | Initial electrochemical cell impedance (Ohms) |
| --- | --- | --- | --- | --- |
| Design K1 | 90 wt % nanographite particles; 10 wt % Kraton 1924 FG (formed by air brushing) | Triple bilayer | NCM | 0.26-0.41 |
| Design K2 | 90 wt % nanographite particles: 10 wt % Kraton 1924 FG (formed by Mayer rod) | Triple bilayer | NCM | 0.47-0.63 |

TABLE 4-continued

| Cell | Protective layer composition | Bilayer or triple bilayer | Cathode type | Initial electrochemical cell impedance (Ohms) |
|---|---|---|---|---|
| Design L | 80 wt % nanographite particles; 20 wt % Kraton 1924 FG (formed by air brushing) | Triple bilayer | NCM | |
| Design M | N/A | Triple bilayer | NCM | 1.22-5.09 |
| Design N1 | 90 wt % nanographite particles; 10 wt % Kraton 1924 | Triple bilayer | NCM | 0.26-0.63 |
| Design N2 | 90 wt % nanographite particles and boron particles; 10 wt % Kraton 1924 FG | Triple bilayer | NCM | 0.26-0.63 |
| Design O | N/A | Triple bilayer | NCM | 1.22-5.09 |

Cells that included the composite protective layer had a longer cycle life and lower impedance than cells that did not include the composite protective layer (see FIGS. 14-15 and Table 4).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode, comprising:
   a first electroactive layer comprising a first electroactive material, wherein the first electroactive material comprises lithium metal prior to charge and discharge cycles;
   a composite protective layer adjacent the first electroactive layer, wherein the composite protective layer comprises a polymeric binder and particles dispersed in the polymeric binder, wherein the particles comprise boron particles, wherein the boron particles make up greater than or equal to 80 wt % of the composite protective layer, and wherein pores make up greater than or equal to 10 vol % of the composite protective layer; and
   a second electroactive layer comprising a second electroactive material adjacent the composite protective layer and positioned at a side of the composite protective layer opposite the first electroactive layer, wherein the second electroactive material comprises lithium metal prior to charge and discharge cycles, and wherein the second electroactive layer has a thickness that is greater than or equal to 1% and less than or equal to 50% of the thickness of the first electroactive layer; and
   an electrolyte adjacent the second electroactive layer, wherein the electrolyte is configured to permeate through at least a portion of the pores of the composite protective layer.

2. An electrode as in claim 1, wherein the particles have an average diameter of less than or equal to 10 microns.

3. An electrode as in claim 1, wherein the polymeric binder comprises a block copolymer or a styrene-butadiene rubber.

4. An electrochemical cell comprising the electrode as in claim 1, wherein the polymeric binder is insoluble and/or non-swellable in the electrolyte.

5. An electrode as in claim 1, wherein the composite protective layer comprises a thickening agent, a plasticizer, an additive, and/or silica.

6. An electrode as in claim 1, wherein the composite protective layer comprises boehmite.

7. An electrode as in claim 1, wherein the area specific impedance of the composite protective layer is less than or equal to 100 Ohm*cm$^2$.

8. An electrode as in claim 1, wherein the electronic conductivity of the composite protective layer is greater than or equal to $10^{-6}$ S/cm.

9. An electrode as in claim 1, wherein the composite protective layer is adjacent a support layer.

10. An electrode as in claim 1, wherein the composite protective layer is adjacent a separator.

11. An electrode as in claim 1, wherein the lithium metal in the first electroactive material and/or the second electroactive material is deposited from a vapor comprising lithium metal.

12. An electrode as in claim 1, comprising a solid electrolyte interface formed upon exposure of the electrode to the electrolyte.

13. An electrode as in claim 1, wherein lithium from the first electroactive layer intercalates into and/or reacts with the particles.

14. An electrode as in claim 1, wherein lithium from the second electroactive layer intercalates into and/or reacts with the particles.

15. An electrode as in claim 1, wherein one or more of the particles are in direct contact with the first electroactive material and/or the second electroactive material.

16. An electrode as in claim 1, wherein at least a portion of the particles of the composite protective layer are randomly dispersed in the polymeric binder.

17. An electrode as in claim 1, wherein the particles comprise intercalated lithium.

18. An electrode as in claim 1, wherein the particles further comprise nanographite particles-comprising nanographite.

19. An electrode as in claim 1, wherein the lithium from the second electroactive layer is configured to intercalate into and/or react with the particles in the composite protective layer to form an electrode structure including a single electroactive layer and a composite protective layer comprising lithium that originated from the second electroactive layer, and wherein the single electroactive layer is the first electroactive layer.

20. An electrode as in claim 1, wherein the composite protective layer comprises pores that make up greater than or equal to 20 vol % of the composite protective layer.

21. An electrode as in claim 1, wherein at least 50% of the pore volume is made of pores having a diameter of greater than or equal to 0.001 microns and less than or equal to 0.5 microns.

22. An electrode as in claim 1, wherein at least 50% of the pore volume is made of pores having a diameter of greater than or equal to 0.001 microns and less than or equal to 0.1 microns.

23. An electrode as in claim 1, wherein the lithium ion conductivity of the composite protective layer is less than or equal to $10^{-7}$ S/cm prior to cycling.

* * * * *